United States Patent
Eickemeyer et al.

(10) Patent No.: US 7,620,799 B2
(45) Date of Patent: *Nov. 17, 2009

(54) USING A MODIFIED VALUE GPR TO ENHANCE LOOKAHEAD PREFETCH

(75) Inventors: Richard James Eickemeyer, Rochester, MN (US); Hung Qui Le, Austin, TX (US); Dung Quoc Nguyen, Austin, TX (US); Benjamin Walter Stolt, Austin, TX (US); Brian William Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 12/061,290

(22) Filed: Apr. 2, 2008

(65) Prior Publication Data

US 2008/0250230 A1      Oct. 9, 2008

Related U.S. Application Data

(63) Continuation of application No. 11/016,206, filed on Dec. 17, 2004, now Pat. No. 7,421,567.

(51) Int. Cl.
*G06F 9/30* (2006.01)
*G06F 9/40* (2006.01)
*G06F 15/00* (2006.01)

(52) U.S. Cl. .................................................. 712/219
(58) Field of Classification Search .................. 712/219
See application file for complete search history.

(56) References Cited

U.S. PATENT DOCUMENTS

| | | |
|---|---|---|
| 5,471,626 A | 11/1995 | Carnevale et al. |
| 5,758,051 A | 5/1998 | Moreno et al. |
| 5,974,538 A | 10/1999 | Wilmot, II |
| 5,987,594 A | 11/1999 | Panwar et al. |

(Continued)

OTHER PUBLICATIONS

Balasubramonian et al., "Dynamically Allocating Prcoessor Resources between Nearby and Distant ILP", ACM Press, ACM Sigarch Computer Architecture News, May 2001, pp. 26-37.

(Continued)

*Primary Examiner*—Eddie P Chan
*Assistant Examiner*—Corey S Faherty
(74) *Attorney, Agent, or Firm*—Stephen J. Walder, Jr.; Diana R. Gerhardt

(57) ABSTRACT

Mechanisms to identify and speculatively execute future instructions during a stall condition are provided. In speculative mode, instruction operands may be invalid due to a number of reasons. Dependency and dirty bits are tracked and used to determine which speculative instructions are valid for execution. A modified value register storage and bit vector are used to improve the availability of speculative results that would otherwise be discarded once they leave the execution pipeline because they cannot be written to the architected registers. The modified general purpose registers are used to store speculative results when the corresponding instruction reaches writeback and the modified bit vector tracks the results that have been stored there. Younger speculative instructions that do not bypass directly from older instructions use this modified data when the corresponding bit in the modified bit vector indicates the data has been modified. Otherwise, data from the architected registers is used.

14 Claims, 11 Drawing Sheets

U.S. PATENT DOCUMENTS

| | | |
|---|---|---|
| 6,356,918 B1 | 3/2002 | Chuang et al. |
| 6,427,207 B1 | 7/2002 | Col et al. |
| 6,430,683 B1 | 8/2002 | Arimilli et al. |
| 6,473,837 B1 | 10/2002 | Hughes et al. |
| 6,950,925 B1 | 9/2005 | Sander et al. |
| 7,114,060 B2 | 9/2006 | Chaudhry et al. |
| 7,194,604 B2 | 3/2007 | Bigelow et al. |
| 7,257,699 B2 | 8/2007 | Chaudhry et al. |
| 7,376,794 B2 | 5/2008 | Steely, Jr. et al. |
| 2003/0126406 A1 | 7/2003 | Hammarlund et al. |
| 2005/0055541 A1 | 3/2005 | Aamodt et al. |
| 2005/0223200 A1 | 10/2005 | Tremblay et al. |
| 2006/0149933 A1* | 7/2006 | Eickemeyer et al. ........ 712/219 |
| 2006/0149934 A1 | 7/2006 | Eickemeyer et al. |
| 2006/0149935 A1* | 7/2006 | Eickemeyer et al. ........ 712/219 |
| 2008/0077776 A1 | 3/2008 | Eickemeyer et al. |

OTHER PUBLICATIONS

Mutlu et al., "Runahead Execution: An Alternative to Very Large Instruction Windows for Out-of-order Processors", IEEE Computer Society, Symposium on High-Performance Computer Architecture, Feb. 8, 2003, pp. 129-140.

Lebeck et al., "A Large, Fast Instruction Window for Tolerating Cache Misses", IEEE Computer Society, International Conference on Computer Architecture, May 2002, pp. 59-70.

* cited by examiner

USING A MODIFIED VALUE GPR TO ENHANCE LOOKAHEAD PREFETCH

This application is a continuation of application Ser. No. 11/016,206, filed Dec. 17, 2004, status allowed.

CROSS REFERENCE TO RELATED APPLICATIONS

U.S. patent application entitled "Branch Lookahead Prefetch for Microprocessors", having Ser. No. 11/016,200, filed on Dec. 17, 2004, and assigned to the assignee of the present invention.

U.S. patent application entitled "Load Lookahead Prefetch for Microprocessors", having Ser. No. 11/016,236, filed on Dec. 17, 2004, and assigned to the assignee of the present invention.

BACKGROUND OF THE INVENTION

1. Field of the Invention

The present invention relates to instruction processing in a microprocessor. More particularly, the invention is a microprocessor that utilizes the time period associated with a stall condition in order to speculatively execute instructions and identify invalid data such that retrieval of valid data can be initiated.

2. Description of Related Art

There is a continual desire by computer users to maximize performance and a corresponding pressure on the computer industry to increase the computing power and efficiency of microprocessors. This is especially evident in the server computer field where entire businesses are dependent on their computer infrastructure to carry out and monitor day to day activities that affect revenue, profit and the like. Increased microprocessor performance will provide additional resources for computer users while providing a mechanism for computer manufacturers to distinguish themselves from the competition.

Over the years, state of the art microprocessors have evolved from fairly straight forward systems to extremely complex integrated circuits having many millions of transistors on a single silicon substrate. One of the many improvements made to microprocessors was the ability of microprocessors to execute more than one instruction per cycle. This type of microprocessor is typically referred to as being "superscalar". A further performance enhancement was the ability of microprocessors to execute instructions "out of order". This out of order operation allows instructions having no dependencies to bypass other instructions which were waiting for certain dependencies to be resolved. The IBM Power and PowerPC series of microprocessors are examples of superscalar systems that provide out of order processing of instructions. Microprocessors may support varying levels of out of order execution support, meaning that the ability to identify and execute instructions out of order may be limited.

One major motivation for limiting out of order execution support is the enormous amount of complexity that is required to identify which instructions can execute early, and to track and store the out of order results. Additional complexities arise when the instructions executed out of order are determined to be incorrect per the in order execution model, requiring their execution to not impact the architected state of the processor when an older instruction causes an exception. As processor speeds continue to increase, it becomes more attractive to eliminate some of the complexities associated with out of order execution. This will eliminate logic (and its corresponding chip area, or "real estate") from the chip which is normally used to track out of order instructions, thereby allowing additional "real estate" to become available for use by other processing functions.

As known in the art, there are certain conditions that occur when instructions are executed by a microprocessor that will cause a stall to occur where instruction execution is limited or halted until that condition is resolved. One example is a cache miss which occurs when data required by an instruction is not available in a level one (L1) cache and the microprocessor is forced to wait until the data can be retrieved from a slower cache, or main memory. Obtaining data from main memory is a relatively slow operation, and when out of order execution is limited due to aforementioned complexities subsequent instructions cannot be fully executed until valid data is received from memory.

More particularly an older instruction that takes a long time to execute can create a stall that may prevent any younger, or subsequent instructions from executing until the time consuming instruction completes. For example, in the case of a load instruction that requires access to data not in the L1 cache (cache miss), a prolonged stall can occur while data is fetched from a slower cache, or main memory. Without facilities to support all out-of-order execution scenarios, it may not be possible to change instruction ordering such that forward progress through the instruction stream can be made while the missed data is retrieved.

Therefore, it can be seen that a need exists for a microprocessor with reduced or limited support for out of order execution that can make progress during stall conditions.

Load Lookahead Prefetch, and Branch Lookahead Prefetch are mechanisms that reduce the performance impact of stalls by allowing the instruction stream to be examined during such an extended stall condition in order to identify and speculatively execute future Load and Branch instructions without updating the architectural state of the machine.

In its basic form however, Load Lookahead Prefetch and Branch Lookahead Prefetch have no mechanism to store results beyond the length of the execution pipelines, limiting its ability to identify loads and branches that would qualify for prefetching and execution respectively. This shortcoming can be addressed by adding facilities to store intermediate results along with a method of managing the use of those values. The effect is increased performance of the Load Lookahead and Branch Lookahead mechanisms.

SUMMARY OF THE INVENTION

In contrast to the prior art, the present invention defines a lookahead prefetch mechanism that reduces the performance impact of a pipeline stall, and the frequency of cache miss stalls by allowing the instruction stream to be examined during an extended stall condition.

Broadly, the present invention allows the microprocessor to identify and speculatively execute future load and branch instructions. When possible, the data for such future load instructions can be prefetched, such that it is either available in the L1 cache, or will be enroute to the processor, allowing the load to execute with a reduced latency when it is re-executed (i.e. non-speculatively executed) after the stall condition expires. The present invention performs this speculative execution without changing the architected state of the microprocessor.

When the machine detects an extended stall condition (for example a load that has an invalid address translation or misses the data cache), lookahead prefetch is started and instructions that would normally have stalled begin to be speculatively executed. Results from speculative instruction execution are provided to younger dependent instructions in the speculative instruction stream when possible using available facilities. Further, in accordance with the present invention, results are provided to the modified general purpose register such that younger instructions can access the results from previously executed speculative instructions.

In speculative execution mode, writeback (storing results in architected facilities) is disabled because of limitations in the ability of the microprocessor of the present invention to support out of order execution. That is, writeback for certain architected facilities cannot occur until the instruction causing the initial stall condition completes. In some specific microprocessor implementations there may be limited facilities for storing speculative results and providing them to dependent instructions. In the case of these microprocessors it becomes necessary to track which results are unavailable or "dirty", from the perspective of younger dependent instructions executing during the stall condition. In other microprocessor implementations additional facilities can be added or allocated to store results from older speculatively executing instructions for use by younger speculative instructions. Additionally, instructions may produce invalid, or "dirty", results during speculative execution for various reasons (for example due to a cache miss, due to facilities not being supported or available during speculative execution, or due to "dirty" source operands, i.e. the propagation of "dirty" results). It is desired to limit the occurrence of prefetches for loads with "dirty" source operands for any of these reasons because these prefetches will not perform valid work by loading data from an invalid address and may have a negative impact on performance by polluting the cache hierarchy with unneeded data. Similarly, it is desirable to limit the execution of branches based on "dirty" source operands to avoid unnecessary redirection of the instruction stream, and possible pollution of the instruction cache hierarchy with unneeded data.

The present invention uses a modified general purpose register as a facility for storing results from speculative instructions that would be discarded when the length of the pipeline is exceeded. A set of status bits in the execution units are also used to dynamically keep track of the dependencies between instructions in the pipeline and transfer "dirty" indications to dependent instructions. A bit vector tracks the availability of valid results for executed instructions for which architected results are not available for use by subsequent instructions. Additionally, a modified GPR bit vector is also used to track results that have changed since Lookahead was started. The "modified" indication is used to select the data sources for future instructions (either the architected results or the modified results and the "dirty" indication is used to prevent loads with invalid source data (e.g. an address where data to be loaded is stored) from being executed. All sources of information are used to tell the load/store unit (LSU) and branch processing unit (BPU) whether or not the source operands (data to be used in the microprocessor operations) for a given calculation are valid. If a load's operands are valid, then a prefetch operation is started to retrieve the valid data from the cache ahead of time such that it can be available for the load instruction when it is subsequently non-speculatively executed. If a branch's operands are valid, then it may be executed possibly resulting n the flushing of subsequent instructions and allowing the branch's target instructions to be fetched before the branch is subsequently non-speculatively executed.

The present invention determines, by speculative execution of instructions during a stall condition, which load and branch instructions are likely to have valid operands. This allows the LSU and BPU to initiate requests for the correct data and/or instructions such that forward progress is made during the stall condition and the data is likely to be available when actual (i.e. non-speculative) execution resumes. By keeping speculative results in one or more modified value GPRs, the amount of forward progress that can be made during a stall condition is further improved.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

For the purposes of example but not limitation, the subsequent descriptions will refer to the enhancement of the Load Lookahead Prefetch mechanism with a Modified Value GPR, however, it should be apparent to one skilled the art that the same Modified Value GPR enhancement applies directly to the facilities required by the Branch Lookahead Prefetch mechanism.

The present invention relates to speculative execution of instructions during a stall condition, referred to as a load lookahead prefetch sequence. Under a basic load lookahead sequence, data can become invalid for two reasons: (a) A load instruction could not return valid data (cache miss, TLB miss, etc.); (b) The data was discarded because it reached the end of the execution pipeline and could not be written to architected facilities.

Co-pending U.S. patent applications "Load Lookahead Prefetch for Microprocessor", having Ser. No. 11/016,236, filed Dec. 17, 2004, describes a mechanism in the execution units to dynamically keep track of the dependencies of any instruction in the pipeline, while the Instruction Dispatch Unit (IDU) tracks for which completed instructions results are invalid. Both sources of information are used to tell the LSU whether or not the source operands for a given Load are valid and if a cache access should be attempted. The limitation of this implementation is that while (a) is the only real source of invalid data, (b) also causes invalid data but exists purely due to not being able to store results without changing the architected state of the machine.

The present invention includes the addition of a secondary "modified value" GPR which will allow results returned during the load lookahead sequence to be saved beyond the end of the execution pipeline. To control the use of this GPR, a modified bit vector is included for tracking results that have changed since the load lookahead sequence was started. The "modified" indication in the modified bit vector is used to select the data sources for future instructions (either the architected results or the modified results), while a "dirty" indication in the dirty bit vector is used to prevent loads with invalid source data from being executed. In one preferred embodiment, the modified value GPR may be logically mapped to the physical register file of a dormant thread in a simultaneous multithreaded (SMT) processor. In an alternative embodiment, the modified value GPR by be implemented as an extension of the architected register file by doubling the physical size of the register file and using an additional bit on the read and write ports to access the modified value storage instead of the architected storage, providing some clear advantages over a using a separate register file to those skilled in the art.

Figure 1:
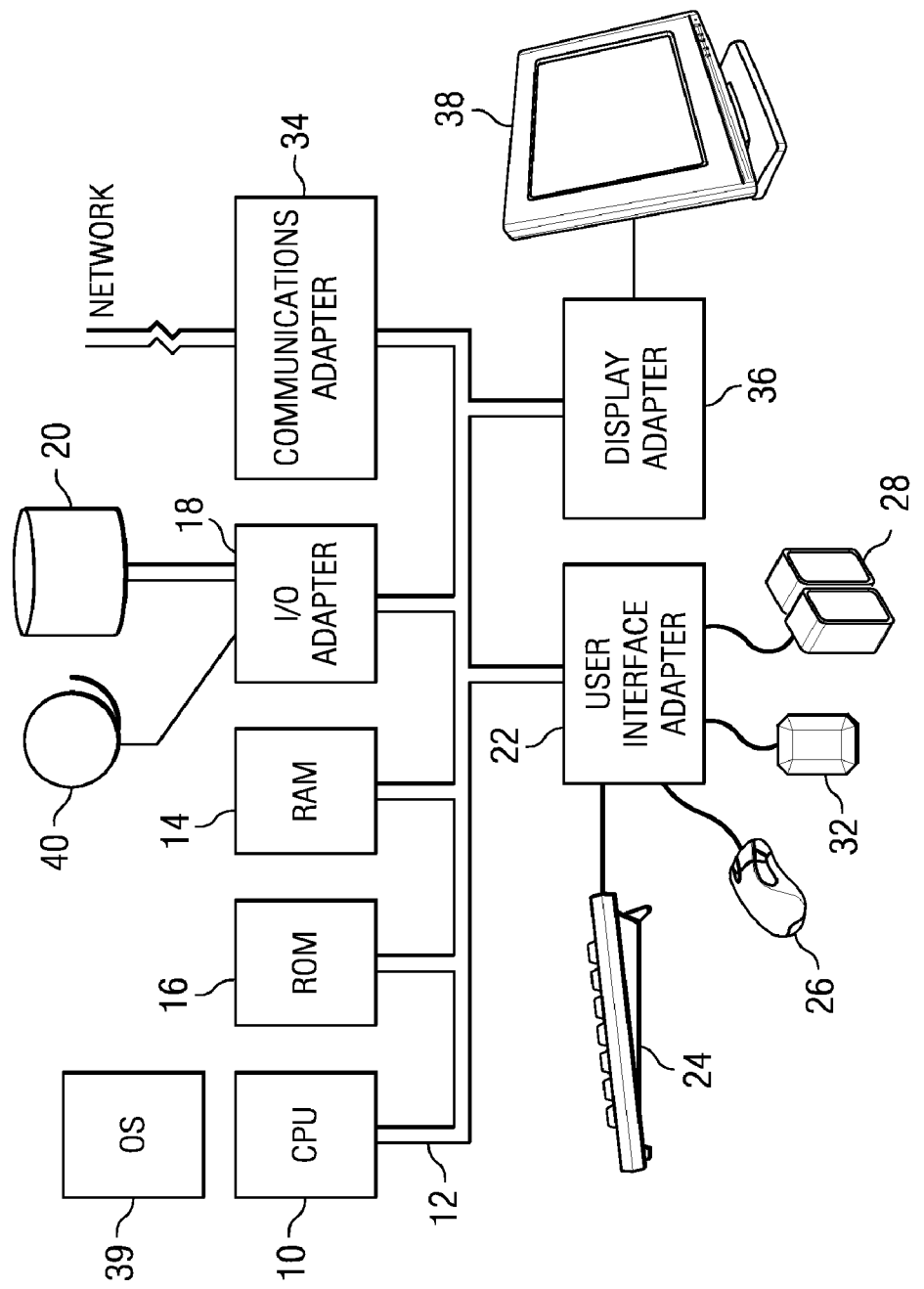
FIG. 1 is a block diagram of an overall computer system that may include a microprocessor capable of implementing the load lookahead prefetch in accordance with the present invention.

Referring to FIG. 1, a typical data processing system is shown which may be used in conjunction with the present invention. A central processing unit (CPU) 10 may include a PowerPC microprocessor, commercially available from the IBM Corporation or a Pentium class microprocessor, available from Intel Corporation interconnected to the various other system components by a system bus 12. Read only memory (ROM) 16 is connected to CPU or microprocessor 10, via bus 12 and includes the basic input/output system (BIOS) that controls the basic computer functions. Random access memory (RAM) 14, I/O adapter 18 and communication adapter 34 are also connected to system bus 12. RAM 14, or main memory, along with a level 1 (L1) and level 2 and level 3 (L2 and L3) caches (if provided) will generally make up the memory hierarchy of the data processing system. Data can be loaded from the larger, slower main memory to the relatively smaller, faster cache memories in order to make it more readily available to the processor when needed. I/O adapter 18 may be a small computer system interface (SCSI) adapter that communicates with a disk storage device 20. Communications adapter 34 may be a network card that interconnects bus 12 with an outside network. Adapter 34 may also include an I/O port that allows a connection to be made through a modem 40, or the like to enable the data processing system to communicate with other such systems via the Internet, or other communications network (LAN, WAN). User input/output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through keyboard 24, trackball 32 or mouse 26 and receiving output from the system via speaker 28 and display 38. Additionally, an operating system (OS) 39, such as the AIX, Linux, Windows operating system, or the like is shown running on CPU 10 and used to coordinate the functions of the various components shown in FIG. 1.

Figure 2:
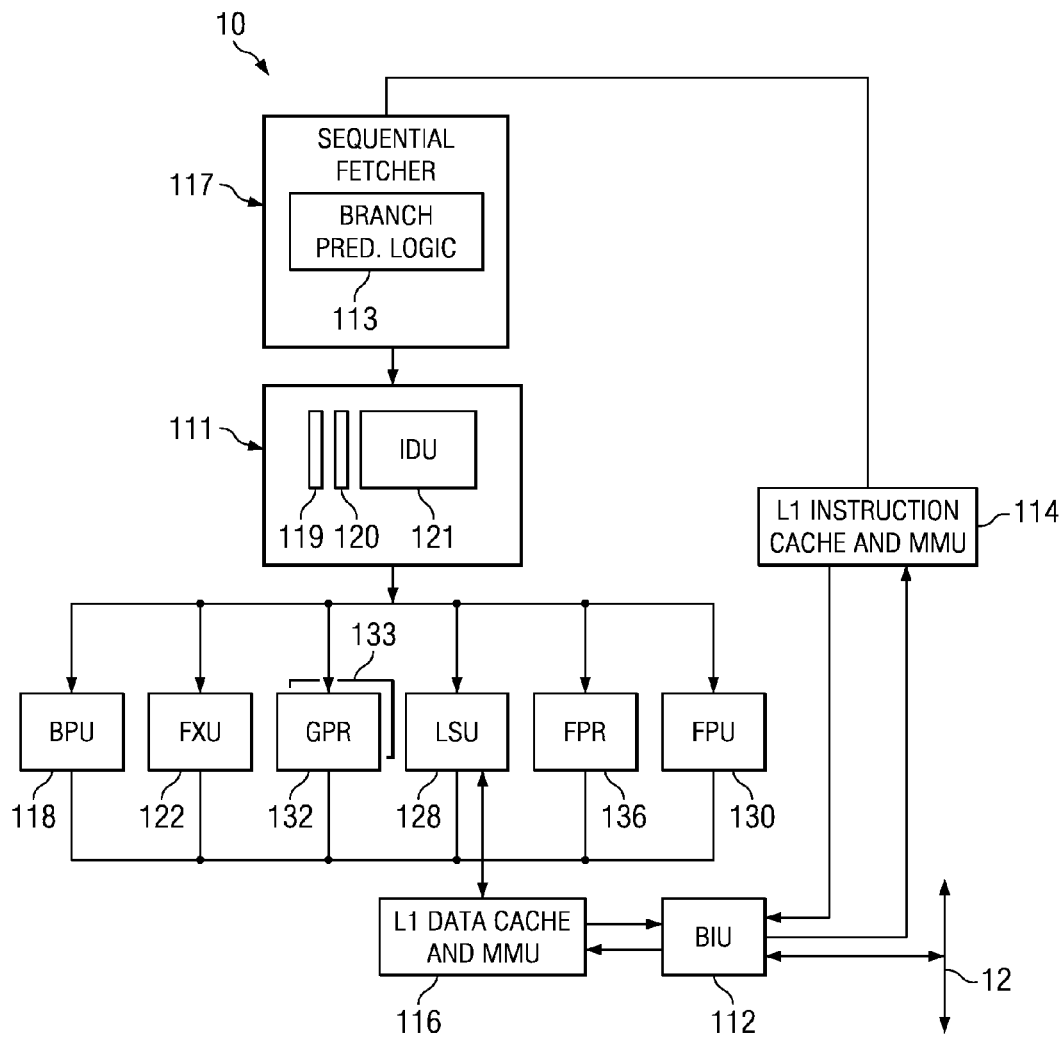
FIG. 2 represents the elements of a microprocessor which may implement the load lookahead prefetch mechanism of the present invention.

Referring to FIG. 2, the basic components of a microprocessor in accordance with the present invention will now be described. Bus 12 connects microprocessor 10 to the other components of the data processing system, including RAM 14 (main memory). Memory 14 provides storage for data and instructions which are provided to, or received from, microprocessor 12 via bus interface unit (BIU) 112. Data information is then stored in L1 data cache and memory management unit (MMU) 116, while instructions are stored in instruction cache and MMU 114. As known in the art, L1 data cache 116 and L1 instruction cache 114 provide smaller but higher speed storage for information being used by the microprocessor. It is desirable to load the L1 cache with the maximum data and instructions that are likely to be used by the microprocessor.

In accordance with the present invention, instructions are retrieved in order by sequential fetcher (IFU) 117 from L1 cache 114 and provided to instruction dispatch unit (IDU) 111. Branch instructions are provided from fetcher 117 to IDU 111, which in turn sends them to branch processing unit (BPU) 118. Branch unit 118 executes branch instructions that control the flow of the instruction stream by branching, or jumping, to another basic block of instructions. Conditional branch instructions evaluate a condition stored in a condition register and branch to another non-sequential instruction when the condition is satisfied and continue sequential instruction processing when the condition is not satisfied. IFU 117 also includes branch prediction logic 113 that provides a prediction as to whether the branch will be taken or not, based on one or more hint bits, the history of previously executed branch instructions, or the like.

IDU 111 includes a 64 entry instruction buffer 121 which receives the fetched instructions from sequential fetcher 117. Instructions are stored in buffer 121 while awaiting dispatch to the appropriate execution units. In a preferred embodiment of the present invention, a modified bit vector is included along with a dirty bit vector 119 in IDU 111, each including 32 bits each one of which corresponds to the 32 registers of the architected general purpose registers 132 and the 32 modified general purpose registers 133, respectively in the microprocessor. It should be understood that architected and modified general purpose registers having 32 entries are used merely as an example and should not be considered a limitation. Those skilled in the art will readily comprehend how general purpose registers (as well as other types of architected facilities such as floating point registers) of other sizes, e.g. 8, 16, 64, 128 and the like, are contemplated by the scope of the present invention. The bits in dirty bit vector 119 will indicate which results in the GPRs have valid, or invalid results. In a preferred embodiment a "0" will be set in the dirty bit vector for those registers having valid results and a "1" in the bit vector will indicate invalid results. The bits in modified bit vector 120 will indicate whether the values in the source registers have been modified by previous instructions executed in speculative mode. In a preferred embodiment a "0" will be set in the modified bit vector for those modified GPRs having results which have not been modified and "1" in the modified vector will indicate modified results. Dirty bit vector 119 and modified bit vector 120 will be described in more detail below.

IDU 111 dispatches instructions to the various execution units, such as a fixed point, or integer unit, FXU 122 and floating point unit FPU 130. Both FXU 122 and FPU 130 are arithmetic/logic units that perform various functions, such as ADD, SUBTRACT, MULTIPLY, DIVIDE. Basically, fixed point arithmetic differs from floating point arithmetic in that scientific notation is possible with floating point operations because the radix point is capable of being moved among the digits of the number. In contrast fixed point arithmetic implicitly sets the radix at a particular place. Fixed point and floating point arithmetic is well known to those skilled in the art and will not be discussed further herein.

Load store unit (LSU) 128 executes instructions that either load information (data and instructions) from memory to the microprocessor registers or store information from those registers into memory. GPRs 132 are associated with FXU 122 and floating point registers FPRs 136 are associated with the FPU 130. These registers store the arithmetic and logical results from execution of the instructions by their respective execution units. It can be seen that IDU 111 is connected to all of the execution units and registers such that any type of instruction can be dispatched from the IDU. Further, the output of the execution units 122, 128 and 130 are connected to the registers 132 and 136 such that the execution units can store results to the registers from executed instructions and then retrieve those results to be used in processing existing or future instructions. The elements shown in FIG. 2 and described above can be considered to constitute the "core" of a microprocessor. With modern technology it is possible and even likely that many microprocessors will include multiple cores and thus have multiple execution units, such as LSUs, FXUs and FPUs.

The conditions that define when load lookahead mode is started include encountering a stall condition wherein a cache miss, or the like is encountered. Results are prevented from writing back by sending a signal with each instruction dispatched indicating that it should be treated as speculative.

Determining which loads are eligible for prefetching requires that instruction dependency and the validity of results be tracked. This functionality is split into two parts. Execution units are responsible for dynamically tracking dependencies for instructions in the execution pipeline using a set of "Dirty" (D) and "Dependency on Load" (DL) bits. For the purpose of example but not limitation, the IDU maintains a global overview of which results are invalid and which are modified (other embodiments may track invalid or modified result status in the execution units, or with the architectural facility). Any results obtained during load lookahead can be passed on to younger instructions either through established forwarding paths or via the secondary modified GPR 133 that is used to store values without changing the real (architected) registers.

At dispatch the IDU will maintain two vectors, one of "dirty" bits to keep track of which results are invalid and one of "modified" bits to keep track of any results obtained as instructions complete. The number of bits in each vector is dependant on the number of architected registers the processor has.

Also at dispatch time, every instruction will lookup all its source registers in the "dirty" and "modified" vectors to determine (a) if any of these are invalid or (b) if these values have been previously modified while in Load Lookahead mode. Both these bits are passed on to the execution unit. The dirty bit will be combined with the result of the Dirty/DL bit mechanism and the modified bit will inform the unit that source information should be read from the "modified value" GPR instead of the architected GPR when results are not available from a pipeline bypass.

As instructions pass writeback, results are written to the "modified value" GPR and the corresponding bit in the IDU's "modified" vector is set. Also, the dirty bit accompanying the instruction is written to the corresponding entry in the IDU's "dirty" vector to indicate whether its results are invalid. The timing is such that the first instruction that can be dependant on the previous result but can no longer receive that value via a forwarding path will be able to look up if the value is dirty in the "dirty" vector instead, and will correctly read from the modified value GPR instead of the architectural GPR.

Figure 3:
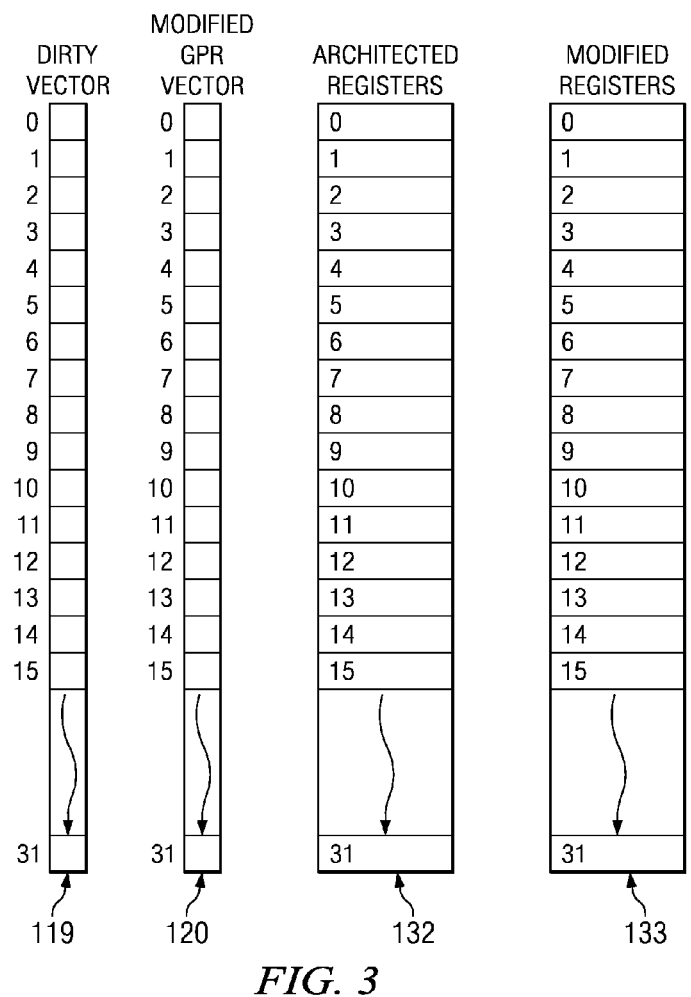
FIG. 3 is a representation of the dirty bit vector, modified bit vector and modified general purpose register, as implemented by one preferred embodiment of the present invention

Referring to FIG. 3, dirty bit vector 119 is shown with its relationship to general purpose registers 132. Each of the 32 bits in vector 119 represent the values in the 32 general purpose registers, i.e. Bits 0-31 in vector 119 directly correspond to registers 0-31 in GPR 132. For purposes of explanation and not limitation, vector 119 is described herein as being associated with GPR 132. It should be understood that other preferred embodiments of the present invention are contemplated in which a dirty bit vector is associated with floating point registers 136, or with register files required to support the Branch Lookahead mechanism, such as condition registers (CR) or link registers (LR).

Also referring to FIG. 3, modified bit vector 120 is shown with its relationship to modified general purpose registers 133. Each of the 32 bits in vector 120 represent the values in the 32 modified general purpose registers, i.e. Bits 0-31 in vector 120 directly correspond to registers 0-31 in modified GPR 133. For purposes of explanation and not limitation, vector 120 is described herein as being associated with modified GPR 133. It should be understood that other preferred embodiments of the present invention are contemplated in which a modified bit vector is associated with modified floating point registers, or other storage facilities.

Further, processors which use multithreading, such as the POWER 5 processor commercially available from International Business Machines Corporation, may include additional physical registers to enable multiple threads to execute simultaneously. In accordance with another preferred embodiment the modified value GPR 133 can be logically mapped to the physical register file of an inactive thread in a multithreaded processor. For example, a table, scoreboard, or the like can be used to redirect instructions to the physical resources allocated to the dormant thread which are not being used, in this example register file 133. A bit in the modified bit vector will cause the instruction to access a table that can map the instruction to a register allocated to the dormant thread. The instruction can then store results, or retrieve operands from this register. Additionally, in another preferred embodiment the size of the architected register file is increased to include the space required by the modified GPR. For example, GPRs 132 and 133 of FIG. 3 could be combined to create 32 registers having an architected portion and a non-architected portion. Read and write ports on the increased size register file (combination of registers 132 and 133) would include at least one additional bit that would allow access by instructions to the modified value storage area, rather than the architected storage area.

Figure 4:
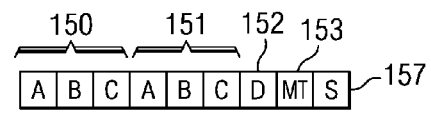
FIG. 4 illustrates the dependency on load (DL) bits as implemented by one preferred embodiment of the present invention.
Figure 5:
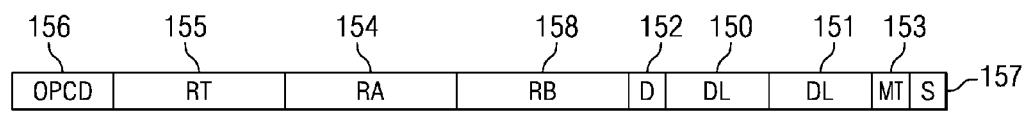
FIG. 5 is a representative microprocessor instruction of one preferred embodiment of the present invention showing the opcodes, source and destination register identification bits, dirty bit and DL bits.

FIG. 4 shows a set of bits which indicate the dependency of speculatively executing instructions relative to one another. These dependency on delayed validation bits can monitor various conditions such as the dependency by a current instruction on a prior instruction that moves data between registers within the microprocessor, or by an instruction that uses data written to a register by an I/O device. In the preferred embodiment the dependency on delayed validation bits will monitor the dependency of a current instruction on the data retrieved by a load instruction. These dependency on load (DL) bits are used to track the time between when a load instruction returns the result and when that result is determined to be valid. For purposes of simplifying the understanding the present invention, the dependency on load (DL) bits will be used as one example of the dependency on delayed validation bits. However, it should be noted that other preferred embodiments may have different, or additional dependency bits to track the distance between the validation of other sources of data (beyond load instructions) and the dependent instruction. The dependency on load example is used herein for the purposes of illustration only and not limitation. The DL bits are essentially a shift counter having a number of bit positions equal to the number of cycles between the time the load is returned and when its validity is subsequently determined. It will be apparent to those skilled in the art that various implementations of the present invention can be utilized wherein the validity may be determined, e.g. two (2) cycles after the result is returned (see timing diagram of FIG. 10) or three (3) cycles after the result is returned (FIG. 11). It will be understood that in the case where three (3) cycles are needed to determine validity, three bits will be needed to track the validity state, i.e. a first bit that is set when the result is returned, a second bit is set corresponding to the first cycle after return and a third bit that will indicate that the determination of validity is completed. In a preferred embodiment there may be two (2), or more, load store units. In this case there will need to be a set of DL bits for each L/S unit. In FIGS. 4 and 5, reference numerals 150, 151 each represent three (3) DL bits that correspond to first and second LSUs, respectively. Further, the dirty bit vector that is associated with the result being processed by the load instruction will be tracked by the instruction. Field 152 of the instruction is a continuation of the dirty bit in vector 119 that is associated with an architected register. This dirty bit "D" in the instruction is also determined, not only by the value in bit vector 119, but also by various other inputs. These include the DL bits, a load reject which is an indication of whether load data is valid, forwarded dirty bits from other instructions, and the like.

Further, with regard to FIG. 4, field 153 will be used in the case where multi-threading is implemented. That is, the processor will need to know which of the two (or more) threads is being executed in order to track the resources, i.e. context of each thread. This bit or an equivalent indicator will be present for all multithreaded implementation, regardless of whether the threads are capable of utilizing the load lookahead prefetch mechanism of the present invention. Finally, a field 157 includes a tag bit that tells the processor whether the instruction is being executed speculatively, i.e. "S".

FIG. 5 is an illustration of an instruction capable of being implemented by a microprocessor that operates in accordance with the present invention. Reference numeral 156 is an opcode that defines the type of operation being performed, such as an ADD, COMPARE, LOAD, or the like. RT 155 is the target register where the results of the operation are stored. Registers RA 154 and RB 158 are two source registers having the operands that are to be manipulated in accordance with the opcode of the instruction. Tag bit 157 is included to indicate whether the instruction is being speculatively executed and will not write its results back to the architected registers, or non-speculatively executed where write back is enabled. Dirty bit 152 and DL bits 150, 151, as well as speculative execution bit 153 have been described above with reference to FIG. 4.

Load lookahead prefetch in accordance with the present invention is started whenever a load (or other instruction that takes a lot of cycles to execute) causes an extended stall condition such that the out of order facilities, if any, provided by the processor can not support further progress through the instruction stream. Once active, it accomplishes three things: (1) allows the execution of instructions without changing the architected state of the machine; (2) determines which loads are eligible to be prefetched; and (3) speculatively prefetches data into the L1 cache.

Once lookahead prefetch mode is activated, instructions that are not supported by the out of order execution mechanisms of the processor (if any), identified herein as "speculative instructions", are not allowed to be written back, that is, speculative results are prevented from being written into the architected registers of the microprocessor. For the case of an in-order processor, all out of order instructions are considered speculative and will not write any architected facilities. If the architected registers were allowed to be updated, then actual execution rather than speculative execution of the instructions would occur. In a preferred embodiment, the present invention is implemented as an in-order microprocessor in which the results of speculatively executed instructions are not allowed to update the architected facilities. However, data processing systems which support all variations of out of order execution are contemplated by the scope of the present invention. In another aspect of the preferred embodiment, it is ensured that instructions are treated as speculative by sending a signal with each instruction dispatched under the load lookahead prefetch mechanism of the present invention, which indicates that the instruction should be treated as speculative. It should be understood that there are other methods contemplated by this invention for tracking speculative instructions.

Several techniques for processing the results of speculative instructions are possible. These include forwarding the speculative data to younger instructions by older instructions in the pipeline during speculative execution as described in co-pending patent application "Load Lookahead Prefetch for Microprocessors", Ser. No. 11/016,236, filed on Dec. 17, 2004, a small cache or, as in the presently described preferred embodiment, using a separate set of storage facilities, such as the modified GPR to store modified values even after the associated instruction has reached the writeback stage.

In any case, determining which loads are eligible for prefetching requires that instruction dependencies and the validity of results be tracked. This functionality is split into two parts. Execution units are responsible for dynamically tracking dependencies related to instructions in the execution pipeline using a set of "Dirty" (D) and "Dependency on Load" (DL) bits. For the purpose of example and not limitation, invalid or unavailable results, particularly for those speculative instructions that are no longer in the pipeline, are tracked in this preferred embodiment by the IDU (other embodiments may track invalid or unavailable architectural facilities in the execution units, or with the architectural facility).

Load lookahead prefetch continues until the initial stall condition is resolved. In the case of a load causing a cache miss, this could be a signal indicating that the load data is now available. When this occurs, normal non-speculative execution will restart at the stalled instruction. Any information about speculative result validity tracked by load lookahead is cleared at this time.

Figure 6:
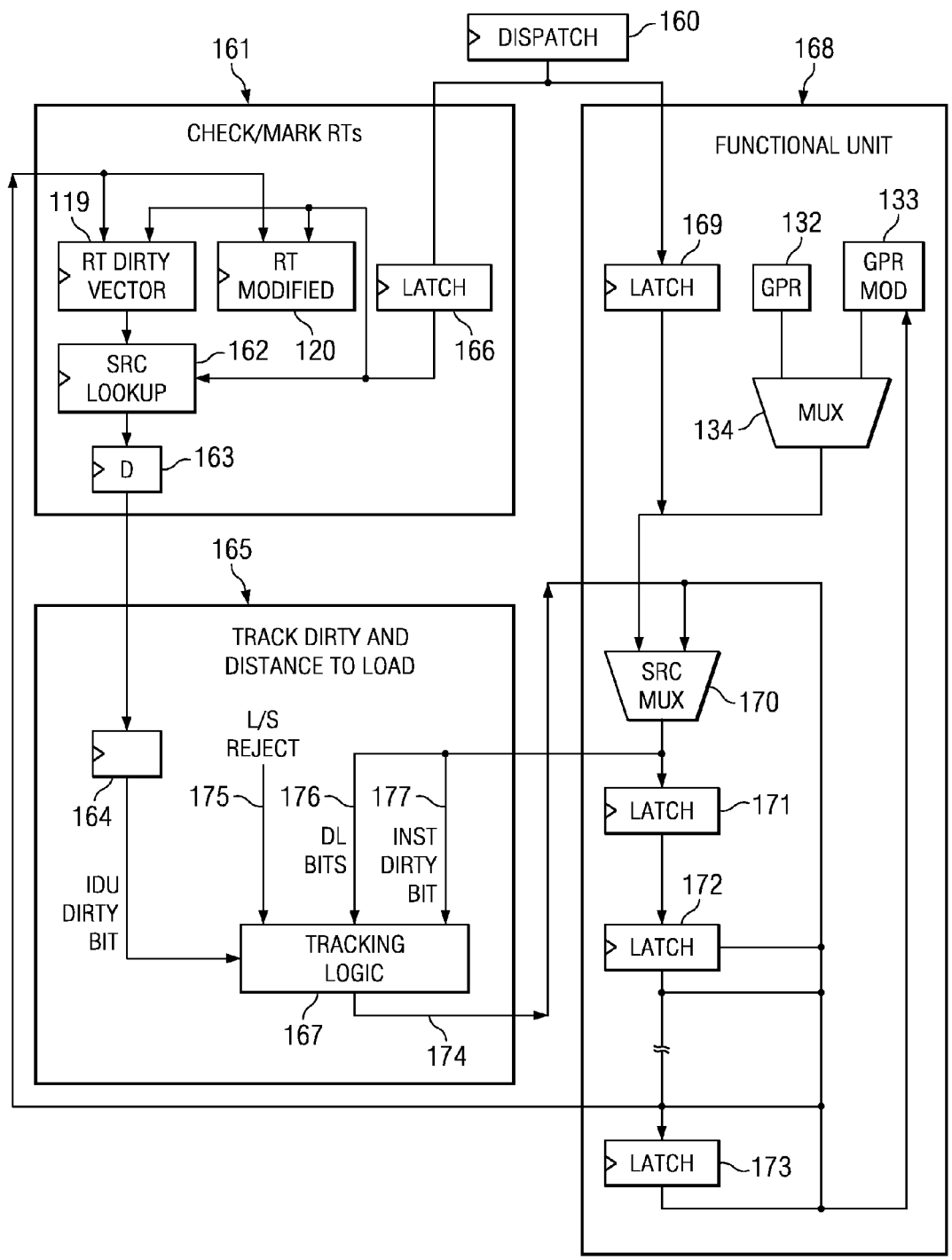
FIG. 6 is a block diagram of the key load lookahead prefetch functions as implemented by one preferred embodiment of the present invention.

FIG. 6 is an overview of the present invention showing the various circuit elements used in a microprocessor utilizing load lookahead prefetch. Microprocessor instructions ready for dispatch are held in a latch 160. These instructions were provided to instruction buffer 121 in IDU 111 and have been processed by instruction sequencing logic prior to be received in latch 160. The instruction is then dispatched from latch 160 to its appropriate functional unit 168, such as the LSU, FPU, FXU or the like and latched in by latch 169. Source lookup logic 162 also receives the instruction via latch 166 and then determines if the source registers contain invalid data, and if so, a dirty bit value is provided to dirty bit latch 163. As noted above, the dirty bit will be provided along with the instruction to the various pipeline stages encountered during instruction processing. Dirty bit logic 161 will be described in greater detail in accordance with FIG. 7.

The dirty bit tracking and dependence on load logic 165 then receives the dirty bit from latch 163 and stores it in latch 164. Those skilled in the art well understand how bits of data and instructions are latched across logic boundaries in order to keep the various processing elements in synchronization with one another.

Tracking logic 167 is also shown as part of dirty bit tracking and DL logic 165. Tracking logic 167 receives several inputs and outputs a dirty bit signal based on the state of the various inputs. The dirty bit from bit vector 119 is input to tracking logic 167 from IDU 111, via latch 164 which represents one of possibly several latches used by the present invention to ensure correct timing and synchronization. A signal representing the reject status of a load instruction (i.e. whether the load data is valid) is also received by logic 167. Further, the DL bits and dirty bit from the instructions in the functional unit 168 are also received by logic 167, which then outputs a dirty bit signal on line 174 as determined by logic 167. There are three (3) criteria which will cause the dirty bit on line 174 to be set: (1) source data marked as "dirty" is forwarded from another instruction in functional unit 168 (i.e. from mux 170); (2) the IDU can determine the source operand is dirty from the associated bit in dirty bit vector 119 and data is read from the GPR; and (3) source data is read from a load that is later determined to be invalid (load reject) as received on input line 175 and the LSB of the DL bits is "1". More particularly, when it is determined that the data is invalid a "reject" signal is input at the appropriate time via a bus 174 to logic 167 such that the dirty bit value is updated. Input lines 176, 177 provide the dirty bit and DL bits from source multiplexer 170. As noted above, the dirty bits and DL bits are forwarded with each instruction as it progresses through the pipeline. It can be seen that line 174 will provide these bits back to source mux 170 after each stage. As will be described in more detail below, the DL bits function as a shift counter with the number of bits being dependent on the cycles needed to validate the load data. The most significant bit (MSB) is initially set and then subsequently shifted as each pipeline stage is traversed. When the least significant bit (LSB) is set, then the determination of the validity of the load data is completed and it will be known whether a load reject has occurred. The operation and use of the DL bits will be described more fully below.

Functional unit 168 includes the pipeline stages commonly found in the vast majority of microprocessors, such as decode, execute (arithmetic and logic operations), writeback and the like. Source multiplexer 170 receives input from GPR 132 and modified GPR 133 via multiplexer 134. Mux 170 also receives input from the latches 171, 172 and 173 associated with each stage, and the dirty and DL bits from tracking logic 167 via line 174. It should be noted that line 174 in FIG. 6 represents multiple dirty bit signals, since tracking logic needs an output from each stage to that stage's own bypass multiplexer. The dirty and DL bits are then added to the instruction by source mux 170 as it enters the pipeline of functional unit 168. This places the instruction in the format as shown in FIG. 5. By way of example but not limitation, latch 169 could be considered the decode and read stage, latches 171 and 172 execute stages and latch 173 the writeback stage.

Figure 7:
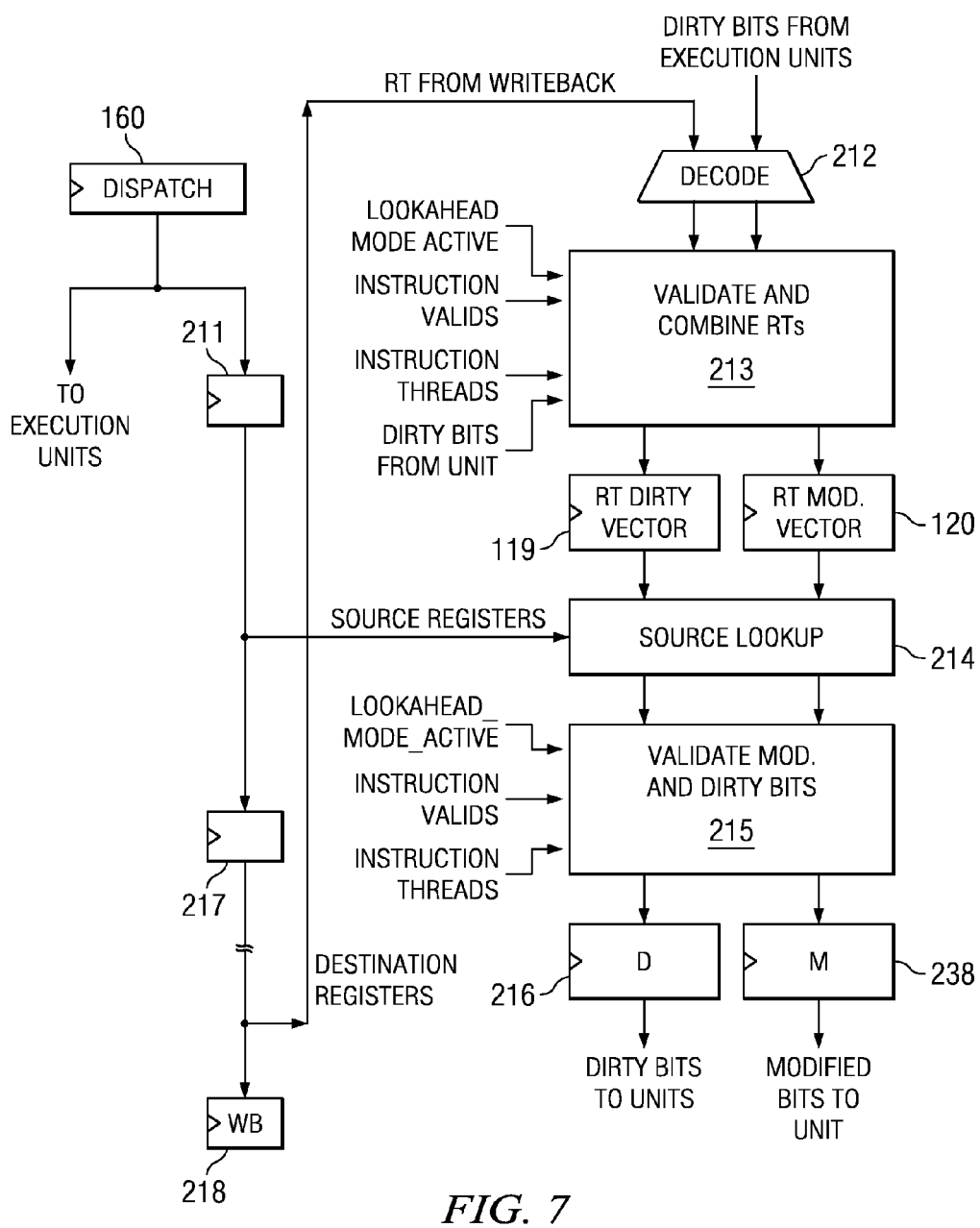
FIG. 7 is another more detailed block diagram that shows the checking and updating functions for the dirty bit vector in the instruction dispatch unit as implemented by one preferred embodiment of the present invention

FIG. 7 shows the checking and updating functions associated with the dirty vector 119 and modified bit vector 120 in the instruction dispatch unit. More specifically, dirty bit vector 119 will be maintained to keep track of which results are no longer available for forwarding. The number of bits in dirty vector 119 is dependent on the number of architected registers present in the processor. Modified bit vector 120 is maintained to keep track of results of older instructions. In this manner any results obtained during load lookahead can be passed on to younger instructions through the modified GPR that is used to store values without changing the architected registers. The number of bits in modified vector 120 is dependent on the number of registers present in the processor.

At dispatch time, every instruction will lookup all its source registers ($R_A$ and $R_B$) in dirty vector 119 to determine if any of these are to be considered invalid. At this time each instruction will also lookup all of its source registers in modified vector 120. Other preferred embodiments may lookup the dirty, or modified state of the register (or other architectural facility) in the dirty vector, or modified vector at the time that the register is accessed. All of the bits in dirty bit vector 119 are initially set to "0" and these bits are set to "1" when the instructions pass the writeback stage. The bits in the modified vector are also set to "0" initially. When instructions pass the writeback stage the results for those instructions are stored in the modified GPR. The modified GPR will have the same number of registers as the architected GPR such that the source registers ($R_A$ and $R_B$), as well as the target registers ($R_T$) are stored in the corresponding modified general purpose register. Source logic 214 looks up the dirty bits in vector 119 for registers associated with the instructions being dispatched and a dirty bit is then forwarded to the functional units via latch 216. Source logic 214 also looks up the modified bits in vector 120 for those registers in the modified GPR associated with the instructions that have passed writeback and a modified bit is then forwarded to the functional units via latch 238. The instruction dirty bit in the functional unit which is an indication that one or more data sources for an instruction are invalid, can be set in one of three (3) ways:

Source data is read from a forwarding path and that data is already marked dirty (dirty bit from an instruction in the pipeline is forwarded)

The IDU indicates that a source operand is dirty based on a lookup in the dirty vector (IDU dirty bit vector 119); or Source data was read from a load that later determines the data is invalid and sends a reject signal (DL bits indicate LSB is "1" and load reject occurs).

The dirty bit is forwarded along with results to any dependent instruction. If an instruction uses multiple sources, the dirty bits can simply be logically ORed together. That is, if an instruction is using $R_A$ and $R_B$, then the dirty bits for these two (2) registers are ORed together and if one bit is set then the data resulting for the execution of the instruction is considered invalid. The LSU will block cache access when it encounters a load with its dirty bit set.

As instructions pass the point where their results are no longer available to younger instructions, for example the writeback stage, which is the point where results calculated by the execution units are provided to the architected registers, the IDU's dirty vector 119 is updated for each target register to indicate which results are invalid (i.e. the dirty bit for the instruction result is written to the dirty vector). The timing is such that the first instruction which is dependent on the previous result, but cannot receive the value via a forwarding path will then be able to look up if the value is invalid in the dirty bit vector. Results from speculative instructions that are no longer available via a forwarding path are written to the modified GPR 133, for a preferred embodiment of the present invention, the modified GPR is written when speculative instructions pass the writeback stage. At this time, the corresponding bit in the modified bit vector is set. Any younger instructions that require the results written to the modified GPR will check the corresponding bit in the modified bit vector, and if it is set then the results stored in the modified GPR will be used. Otherwise the result from the architected GPR 132 will be used by the younger instruction.

As shown in FIG. 7, instructions ready for dispatch are stored in latch 160 and then provided to another latch 211, as well as to the execution units. Logic 213, via decode 212, receives instructions from the writeback stage subsequent to latch 217 and prior to the instruction being provided to writeback latch 218. Logic 213 determines if the instruction associated with the target register is considered invalid. This logic determines if the result register is dirty based on: (1) the dirty bit associated with the result (forwarded from the execution unit); (2) load lookahead prefetch mode is active; (3) the instruction is currently considered valid; and (4) whether there are multiple threads in the processor and which thread is current, i.e. the dirty bit needs to be written to the dirty bit vector of the correct thread. If the four (4) previous considerations are true, the dirty bit for that instruction's target register is set. Dispatched instructions are provided to source lookup logic 214 which examines the source registers and uses the dirty bit vector 119 to determine whether the data is valid. Further, 213 determines if a value in the modified GPR has been modified based on the bit in the modified vector 120. The bits in the modified vector will determine the source has been modified by an older instruction. A logical "1" in the dirty bit vector will be associated with the instruction being processed when the source data is invalid and a "0" will be associated with the instructions if the source data is valid. A logical "1" in the modified bit vector will be associated with the instruction being processed when the source date has been modified and a "0" will be associated with the instructions if the source data is unchanged during speculative execution mode. Of course, these bit values are merely exemplary and other patterns are contemplated by the scope of the present invention to indicate the validity of the instruction data. Logic 215 then validates the dirty bit and modified bit by determining if lookahead mode is active, the instruction is valid and whether the correct thread is being utilized. The dirty bit is then provided to latch 216 to be subsequently supplied to the instruction in the execution unit, and the modified bit is provided to latch 238 to be provided to the corresponding instructions in the execution unit. It can be seen that the instruction is initially provided to both the dirty and modified bit logic 215 and the execution units. Once the dirty and modified bit logic 215 determines the appropriate state of the corresponding bits, it is then supplied to the instruction as it is proceeding through the execution pipeline.

Figure 8:
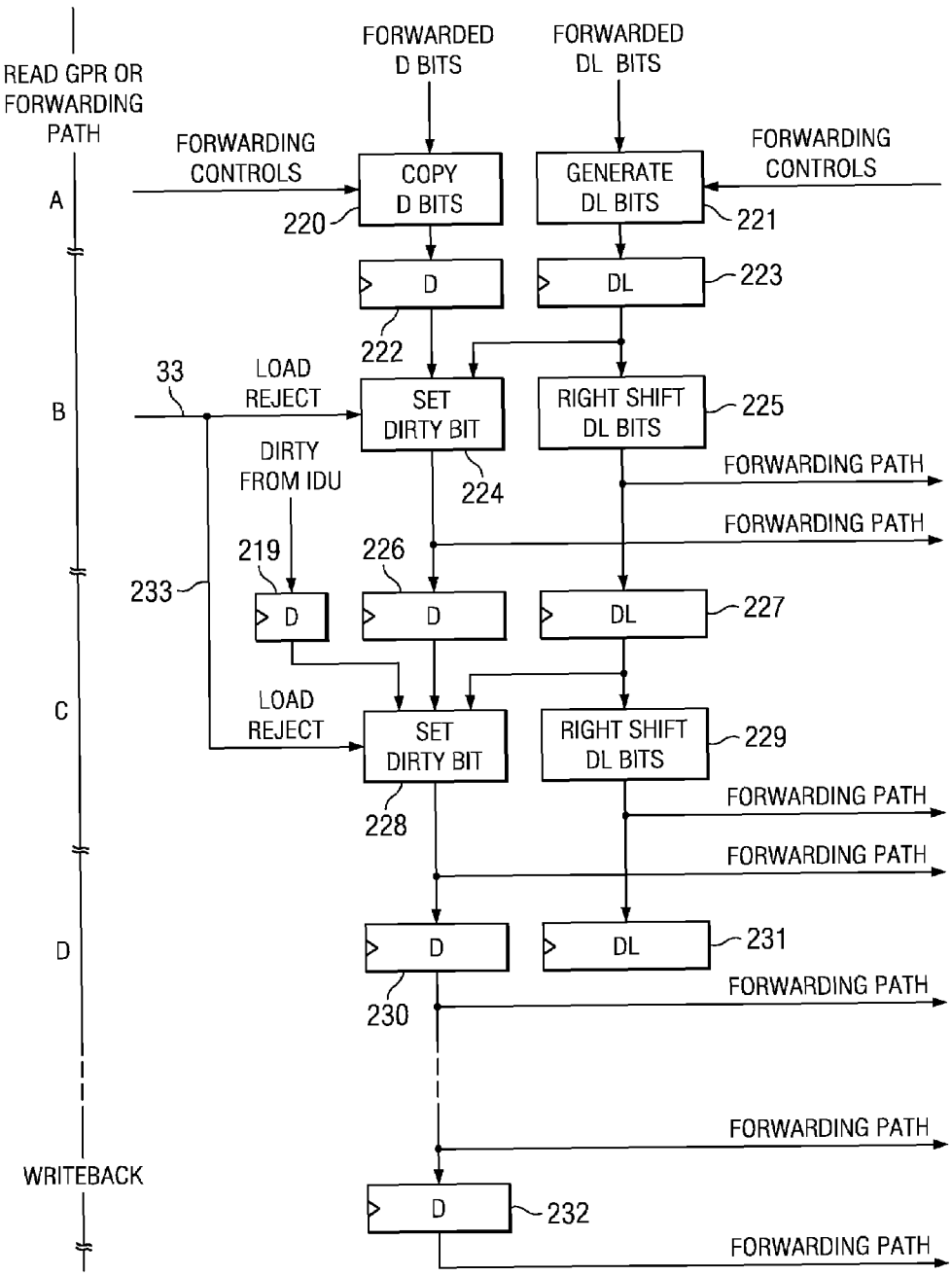
FIG. 8 is a block diagram that represents the tracking of the dirty bit and DL bits as they are maintained in the execution units as implemented by one preferred embodiment of the present invention.

FIG. 8 shows in greater detail the logic used in conjunction with the tracking of the dirty and DL bits. To improve performance, load/store units in one preferred embodiment return load results before having determined if those results are actually valid. If they are determined not to be valid, a "reject" signal is provided to indicate this invalid state. In this case a situation is created wherein a younger, dependent instruction may have already used the returned load result as source data before that data is determined to actually be valid.

Dependence on load (DL) bits are used within the execution units to indicate the occurrence of such a condition. The DL bits function as a shift counter that counts down the time, in microprocessor cycles, between when a load instruction returns a result from memory and when it can send a reject signal. That is the reject signal will be sent if the load data is determined invalid. In the case where the load is determined valid, then no reject signal is sent and processing is allowed to continue. The length of this time window, and accordingly the number of DL bits required is specific to the implementation of the LSU. In the case of microprocessors having multiple LSUs, a set of DL bits must be maintained for each LSU. The DL bits are set whenever an instruction receives forwarded data from another instruction in the pipeline. The number of sets of DL bits will correspond to the number of LSUs present in the microprocessor. In this manner the DL bits from a particular LSU will indicate that the validity of load data for that LSU. Once an instruction has passed the latest point, in terms of cycles after the load result is received, where it could be "rejected" the DL bits are no longer needed.

In accordance with the present invention the DL bits are set as follows:
- an instruction that uses the forwarded result of a load instruction as early as it is available will set the MSB of its DL bits;
- an instruction that uses the forwarded result of a load instruction one cycle after it is available will set the second MSB of its DL bits;
- an instruction that uses the forwarded result of a load instruction n cycles after it is available will set the nth MSB of its DL bits; and
- an instruction that uses the forwarded result of a non-load instruction will copy that instruction's DL bits.

The DL bits are then shifted every cycle. When a reject signal from an invalid load is encountered, the least significant DL bits of any dependent instruction will indicate that it depends on the rejected load. This instruction can then be marked, using the dirty bit, as having invalid source data. If the instruction receives data from a load that has already past the validation stage, then the instruction will get a dirty bit from the load at the time of the result bypass. Result data from a rejected load will be marked as dirty such that any dependent instruction that receives this data via a forwarding path will identify the data an dirty.

Returning to FIG. 8, the instruction flow through the various logic and latches associated with four (4) pipeline stages is shown. It should be noted that four stages are used merely as an example and any number of implementations having different stages are possible and contemplated by the scope of the present invention. In stage A a load instruction reads the data from the GPR or forwarding path and receives an indication of the status of the data (by forwarded dirty and DL bits). At this time it is unknown whether the data read from the GPR is valid or invalid. Also at stage A, logic 220 is used to copy the dirty bit associated with the instruction being executed from the output of a subsequent stage (stage B, C or D in this example). This dirty bit may have been received from latch 216 in the IDU (FIG. 7) and placed into latch 219 before being provided to dirty bit setting logic 228 in stage C. It should be noted that it takes a number of cycles for the dirty bit value to be supplied from the IDU to the execution units (other embodiments may not have such a delay as the dirty bit may be keep with the data in a register file, or elsewhere in the vicinity of the execution units). This is why the dirty bit is not provided until stage C. Additionally, conditions in the functional units (e.g. FXU) may cause the dirty bit to be set when the appropriate inputs are provided to logic 224 and 228. These conditions include the LSB of the DL bits set to "1" coupled with a load reject signal, or a forwarded dirty bit from an older instructions. Referring back to stage A, the dirty bit from logic 220 is then placed in latch 222. DL bit generation logic 221 receives the forwarded DL bits from a previous instruction and sets the bits in latch 223.

In stage B, logic 224 receives the dirty bit from latch 222 and DL bits from latch 223 as well as a reject signal from line 33. The least significant bit of the DL bits (variable A), from latch 223, is then ANDed with the reject signal from line 33 (variable C). This result is then ORed with the dirty bit (variable B) to determine if the source registers associated with the instruction contain valid data. That is, the logical function (A AND C) OR B will determine whether the data is valid. As noted above, the DL bits function as a shift counter with the most significant bit originally set. The bit is then shifted until it reaches the LSB position at which time it is known whether the load data is valid. Logic 225 performs the shift counter function at stage B and right shifts the DL bits before sending them to latch 227 and forwarding the bits back to generation logic 221. The result of the above AND/OR operation is then provided to latch 226, as well as logic 220.

Stage C performs the same essential functions as stage B. Latch 227 provides the DL bits to shifting logic 229 and dirty bit setting logic 228. Logic 228 ANDs the least significant DL bit (variable A) from latch 227 with the load reject signal from line 233 (variable C). The dirty bit from latch 226 (variable B) is then ORed with the result from the AND operation between the DL bit and the load reject, and the result is provided to dirty bit latch 230 and dirty bit copy logic 220. The resulting DL bits output from logic 229 are provided to latch 231 and also forwarded back to stage A and input to logic 221.

This processing continues until the writeback stage D is encountered. As noted earlier, load lookahead speculative execution cannot be allowed to update the architected registers and the dirty bits from latch 232 are provided to a mechanism that bypasses the system GPRs via a forwarding path mechanism as shown in FIG. 8.

Figure 9:
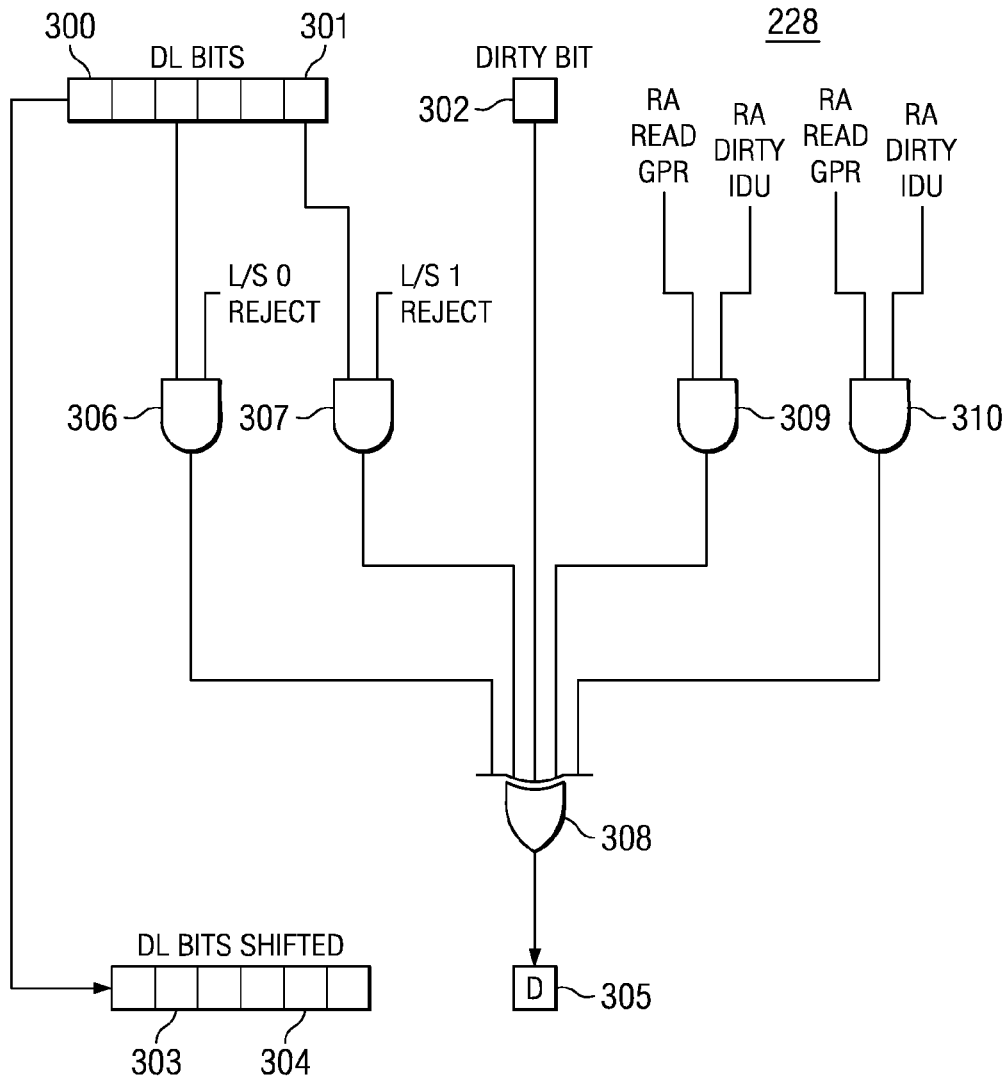
FIG. 9 is a logic diagram that illustrates the logical relationships between the dirty bit vector, execution unit dirty bit, DL bits and load reject signals of the tracking function of FIG. 6 as implemented by one preferred embodiment of the present invention.

FIG. 9 illustrates in more detail the logic implemented by the "set dirty bit" logic 224 and 228 of FIG. 8. In one preferred embodiment two load/store units (L/S 0 and L/S 1) are present such that two (2) sets of DL bits will be provided, one for each load store unit. More particularly, the DL bits from a prior instruction are shown by reference numerals 300 and 301. It can be seen that the LSB positions from DL fields 300 and 301 respectively are coupled to AND gates 306 and 307, respectively. These AND gates also receive inputs indicating whether the load operations from L/S 0 and L/S 1 are rejected, i.e. the load data is invalid. As shown in FIG. 9, if the DL LSB is set to "1" and the loads are rejected (set="1"), then a "1" output is provided to OR gate 308. This is true for both L/S 0 and L/S 1, i.e. when the loads are rejected for either load/store unit and the load data is not valid, then a "1" is provided from AND gates 306 and 307 to OR gate 308.

Further, a dirty bit from vector 119 corresponding to the register addresses from the instruction being executed is read and input to AND gates 309 and 310. For example, when an instruction uses registers $R_A$ and $R_B$, the associated dirty bit from vector 119 is used as an input to AND gates 309, 310. It is also determined whether the registers $R_A$ and $R_B$ are read from the register file (e.g. GPR for integer operations). It should be noted that the present invention contemplates any type of register file and a GPR is used herein only for purposes of explanation. If the registers used by the instructions are read from the register file, e.g. GPR, then a "1" is input along with the corresponding dirty bit value into AND gates 309 and 310, respectively. It can be seen that when the operand is read from the register (e.g. $R_A$) and the dirty bit corresponding to $R_A$ is set, then a logical "1" output is provided from AND gate 309 to OR gate 308. Similarly, when $R_B$ is read from the GPR and its corresponding dirty bit from vector 119 in IDU 111 is set, then a logical "1" will also be provided to OR gate 308 from AND gate 310.

The outputs from AND gates 306, 307, 309, 310, along with the dirty bit forwarded with result data, such as a source operand from any previous instruction are then ORed together and if any one of these inputs is true (e.g. set equal to "1"), then the dirty bit 305 is set and forwarded to a younger instruction in the pipeline. If none of the inputs to OR gate 308 are true, then the dirty bit is not forwarded and the DL bit in fields 303 and 304 are shifted to the right, since it would not have been in the least significant bit position. In this manner, the present invention can track the status of the dirty bit for instructions proceeding through the pipeline stages of the microprocessor.

Figure 10:
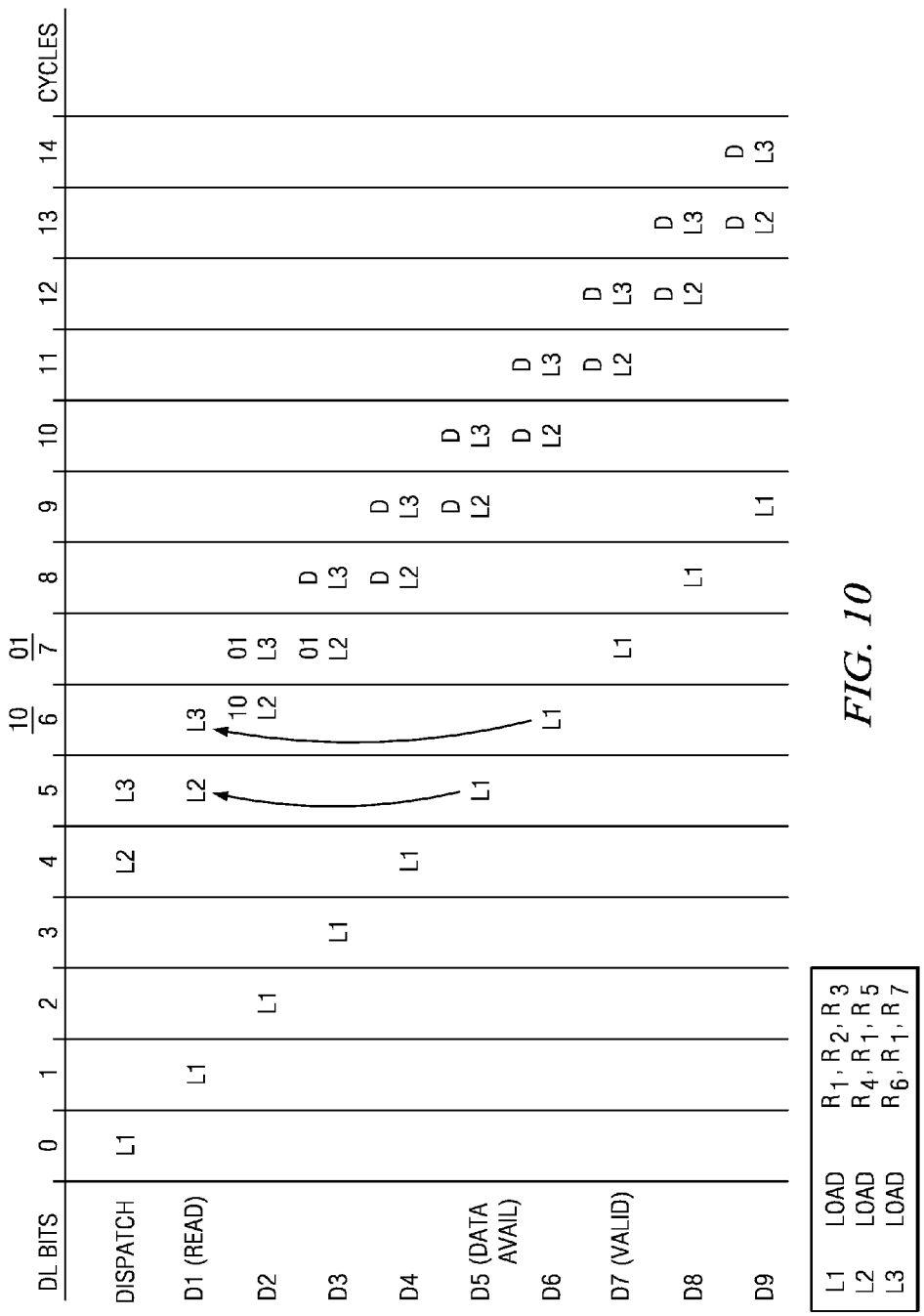
FIG. 10 is a timing diagram showing a progression of load instructions through the pipeline in accordance with a preferred embodiment of the present invention.
Figure 11:
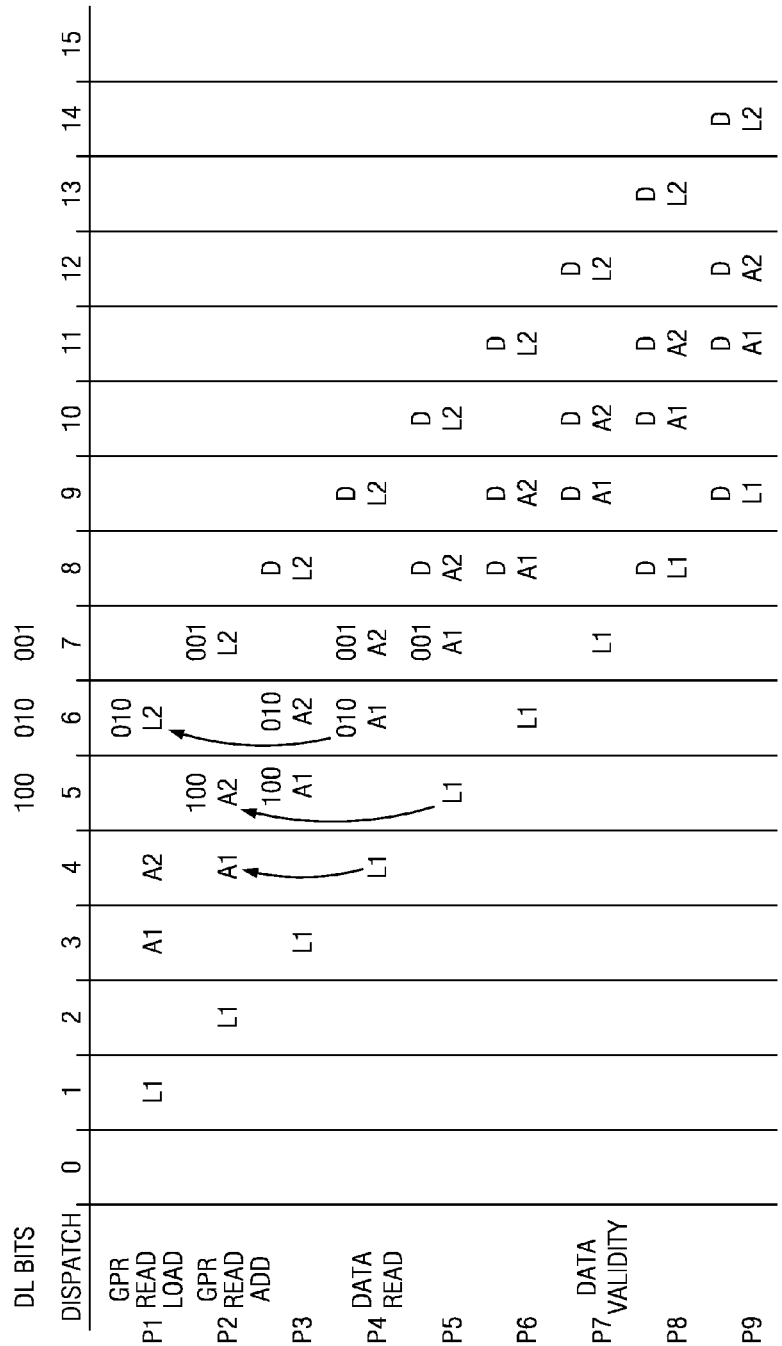
FIG. 11 is a timing diagram that illustrates load and arithmetic/logical instructions in the pipeline of a microprocessor contemplated by a preferred embodiment of the present invention.

Referring to FIG. 10, a timing diagram is shown that tracks a series of load instructions through the microprocessor pipeline. At time zero the first load instruction $L_1$ is in the dispatch unit. Four cycles later load $L_2$ is in dispatch with load $L_3$ being in dispatch at cycle five. As known in the art, these load instructions will continue through the various pipeline stages, such as decode, execute and write back. In one preferred embodiment eight (8) stages are included in the microprocessor pipeline, however other microprocessors with different numbers of pipeline stages are also contemplated by the scope of the present invention. At cycle 1 (stage D1) of FIG. 10, the load instruction reads it source data, i.e. the instruction reads its source operands during the first processor cycle. For the purpose of example and not limitation the following load instructions will be used to assist in the description of FIG. 10.

$L_1$ Load $R_1$, $R_2$, $R_3$ $L_2$ Load $R_4$, $R_1$, $R_5$ $L_3$ Load $R_6$, $R_1$, $R_7$ For this type of load instruction, the values in the second and third registers are manipulated (usually through an ADD instruction) to calculate the address in memory where the value to be accessed is currently stored. The first register is where the value retrieved from memory is to be placed. Using $L_1$ as an example, the values in registers $R_2$, $R_3$ are added to obtain an address which is then used to access a memory location. The value in that memory location is then retrieved and stored in register $R_1$.

Returning to FIG. 10, load instruction $L_1$ proceeds through the pipeline until it reaches cycle 5 at which point the data retrieved from the local cache is available. If either $R_2$ or $R_3$ are dirty, then $L_1$ will forward a dirty indication in cycle 5 to $L_2$ with the data and in cycle 6 to $L_3$ since the data is known to be invalid. If $R_2$ and $R_3$ are not dirty then it is unknown at cycle 5 whether the data is valid or invalid. Also, at cycle 5, the DL bit shift counter is initialized for instruction $L_2$ since it is reading in the results from $L_1$. In this embodiment two (2) cycles are needed to determine the validity of data in $R_1$, thus two (2) corresponding DL bits are needed in accordance with the embodiment of the present invention shown in FIG. 9. Therefore, the DL bits are set to (10) at cycle 6. When load instruction $L_1$ reaches stage/cycle 7, the validity of the data is known and the DL bits of instruction $L_2$ become (01). At this point, if the load has not been rejected the data in register $R_1$ is known to be valid (FIG. 9). In the case where the data in $R_1$ is valid, then the results of the calculation of the address for load instruction $L_2$ are correct. However, when the data in $R_1$ is invalid due to a cache miss, then $L_1$ will initiate a prefetch request if its own address calculation data was valid ($R_2$ and $R_3$ are not dirty). Also, when $R_1$ is invalid the output of OR gate 308 (FIG. 9) will be dirty, and the prefetch operation of the present invention will be blocked for instructions $L_2$ or $L_3$. More particularly, when the dirty bit is set, there is no reason to continue with the prefetching of invalid data for $L_2$ or $L_3$. Further, when the data is invalid, or dirty, the bit 305 (FIG. 9) forwarded to younger instructions in the pipeline is set indicating that the load data cannot be used. Similarly, the validity of data values retrieved by load instructions $L_2$ and $L_3$ will be determined at cycles 11, 12, respectively, so that, at this point, the data is available for use by subsequent instructions when valid, or can be reloaded if it is invalid.

Referring to FIG. 11, another timing diagram is shown that includes both load instructions and arithmetic/logical instructions. Again, for the purposes of explanation and not limitation, ADD instructions are used as the arithmetic instructions. In this example the instructions used for the description are:

$L_1$ LOAD $R_1$, $R_2$, $R_3$ $A_1$ ADD $R_2$, $R_1$, $R_4$ $A_2$ ADD $R_5$, $R_1$, $R_6$ $L_2$ LOAD $R_3$, $R_2$, $R_7$

At stage P1 the load instruction $L_1$ reads the values $R_2$, $R_3$ from the GPRs and manipulates these values to find the address of the data to be loaded into register $R_1$. Add instruction $A_1$ is dispatched two (2) cycles after load instruction L1 and it will read the result from the load instruction of cycle four (4), however, at this point it is unknown whether the load data is valid. It can be seen that ADD instruction $A_1$ is dependent on load instruction L1, since the ADD uses the value from the load instruction (i.e. data that will be loaded to register $R_1$ when writeback occurs) L1 as an operand. The data is then read from load instruction L1 at cycle four (4) and the DL bits for cycle five (5) are set to 100. It should be noted that in the implementation of FIG. 11, it will take three (3) cycles (as opposed to 2 cycles in the embodiment of FIG. 10) to determine if the load will be rejected. Therefore, three DL bit positions are required for the implementation of FIG. 11 (100, 010, 001), while only two DL bit positions are needed for the implementation of FIG. 10 (10, 01). Returning to the timing diagram of FIG. 11, at cycle five (5) the ADD instruction $A_2$ will receive the data from the load instruction, if it is valid, but as previously noted it is not known at this time whether the data is valid, or invalid. When the LSB of the DL bits is not set, then the validity of the data is unknown. Next, at cycle six, (6) the DL bits are shifted to 010, for ADD instructions $A_1$ and $A_2$. At cycle seven (7) the DL bits are then shifted to where the LSB is now "1", i.e. 001, and at this time it is known whether the data is valid or not. The data was provided to both ADD instructions $A_1$ and $A_2$, and used as an operand for both of these instructions. The DL bits are combined with the load reject signal (data valid) as shown in FIG. 9 to set the dirty bit for instructions $A_1$ and $A_2$. Load instruction $L_2$ is using the value calculated by ADD instruction $A_1$ as one of its memory address determining operands. During cycle 6, load instruction $L_2$ copies the DL bits from ADD instruction $A_1$, shifts the bit to the right and then writes "001" in cycle 7. It can be seen from this example that the dependency existing between load instruction $L_1$, ADD instruction $A_1$ and Load instruction $L_2$ is maintained by the DL bits in accordance with the present invention. When instruction $L_1$ is determined to be invalid during cycle 7, the DL bits of instruction $L_2$, which are "001", cause $L_2$ to be marked as dirty. If the source data is in fact dirty, then the load operation in blocked. That is, if load $L_1$ is invalid (load reject) $L_2$ will not attempt to read the cache and the load data for $L_2$ will not be prefetched because the address for the location where the data is stored was computed based upon the invalid data from load $L_1$. In the case where data retrieved from memory is not valid it will be reloaded during the stall condition in order to have the data in the L1 cache when the stall is resolved to aid in the operation of the microprocessor.

Figure 12:
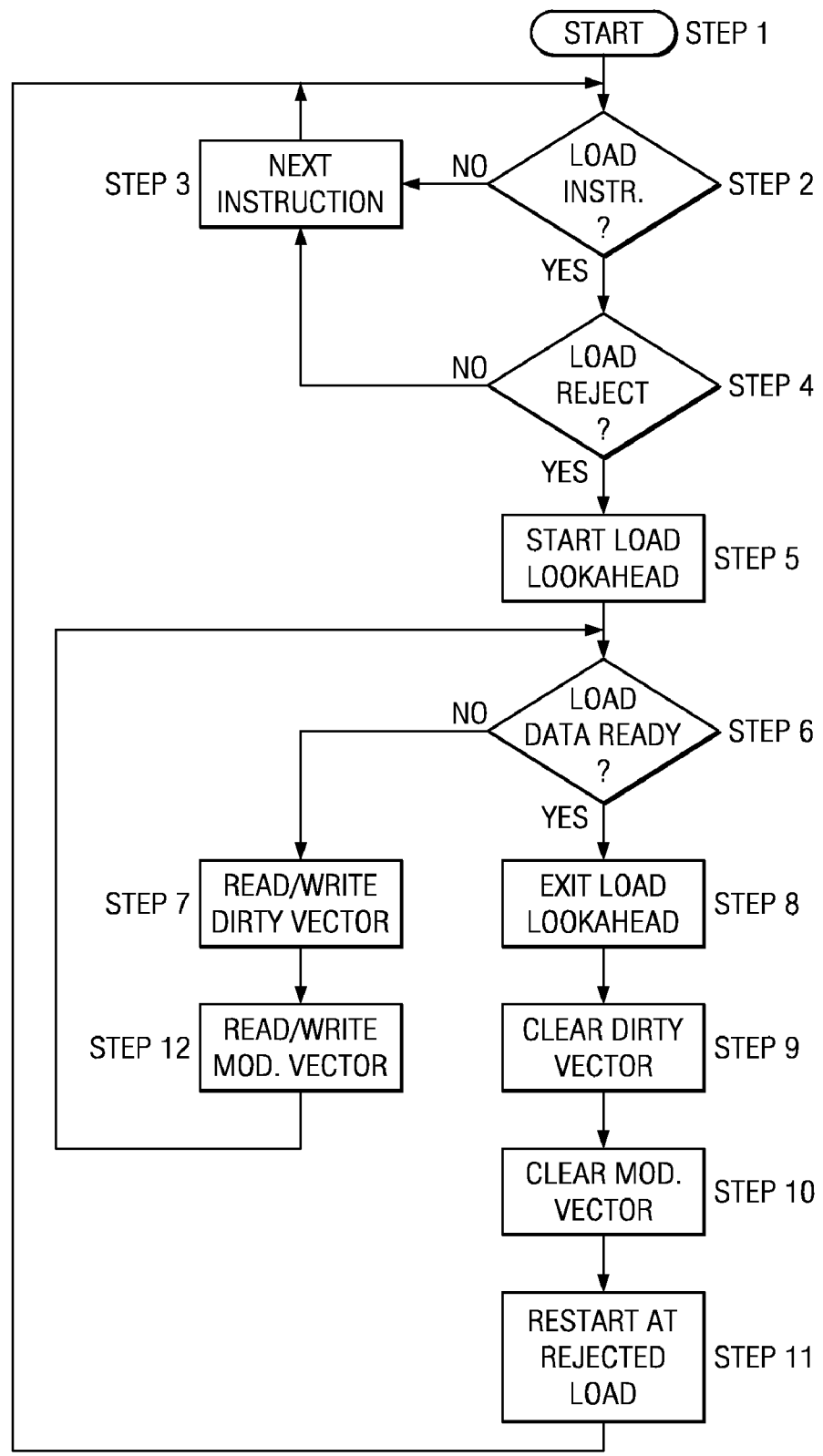
FIG. 12 is a flow chart showing the initiation of the load lookahead prefetch as implemented by one preferred embodiment of the present invention.

FIG. 12 is a flow chart showing when the load lookahead prefetch mechanism of the present invention is entered and exited for a preferred embodiment in which a load cache miss is the extended stall condition for which speculative execution is initiated. At step 1 the process is started and step 2 determines if the instruction is a LOAD instruction. If not, then the process proceeds to step 3 and a determination of whether the next instruction is a LOAD occurs by looping back to step 2. However, if at step it is determined that the instruction is a LOAD, then step 4 determines whether a load reject has occurred such that a stall condition exists in the in-order microprocessor, such as a cache miss, address translation table miss, or the like. If there is no stall condition, then the process loops back to step 3 and the microprocessor continues actual (non-speculative) instruction execution. If, at step 4 it is determined that a stall condition exists, then the load lookahead prefetch method is initiated at step 5. It is then determined by step 6 if the data to be loaded is ready and if not, step 7 will cause the dirty bit vector to be updated for any instructions passing the write back stage. More particularly, all instructions (e.g. LOAD, ADD, etc.) will write to the dirty bit vector to indicate that results were not written to the GPR. That is, there is no write back allowed to the architected registers in the lookahead mode of the present invention. At the same time, any instruction, e.g. arithmetic/logical operation, which seeks to use the data in a particular register will read the dirty bit vector to determine if the data is valid and can be used. It should be noted that all instructions will write dirty bits and read dirty bits by receiving (reading) forwarded dirty bits from older instructions, or forwarding (writing) dirty bits to younger instructions. At step 8 the modified bit vector to be updated for instructions that pass the writeback stage (when the results are written to the modified GPR. More particularly, all instructions (e.g. LOAD, ADD, LOGICAL) will write to the modified bit vector to indicated that the results were written to the modified GPR. After step 8, the process loops back to step 6 until the data to be loaded is ready. If, at step 6 the load data is ready then the load lookahead method is exited at step 8 and all dirty bits are cleared at step 9. The modified bits in the modified bit vector are then cleared at step 10. The load operation is then restarted at step 11 to reload the data that was initially rejected at step 4. In this manner, the present invention will maximize the data available in the L1 cache such that the likelihood of another rejected load operation (cache miss) for the desired data is minimized.

Figure 13:
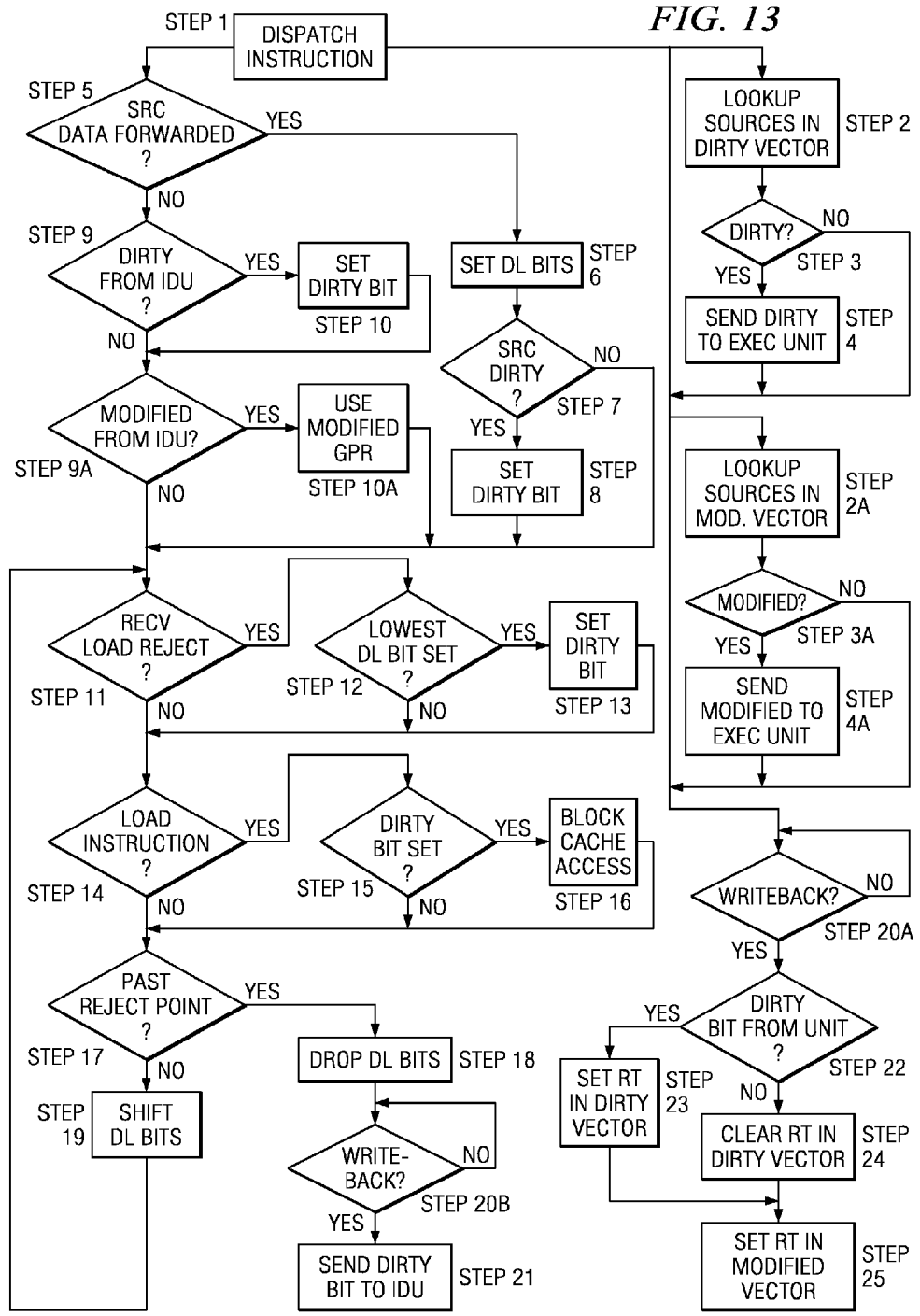
FIG. 13 is another flow chart showing the instruction flow through a microprocessor operating in accordance with a preferred embodiment of the present invention.

FIG. 13 will now describe the process steps for the lookahead prefetch mechanism with a modified value GPR which is started at step 5 of FIG. 12 for one preferred embodiment of the present invention based on load lookahead prefetch. At step 1 of FIG. 13, the instruction is dispatched and the dirty and modified bit vectors are checked, in step 2, against the registers that are being called for as the data or operand sources for the instruction. A determination as to whether the dirty bits are set (indicating invalid data) is made at step 3. If the data is not dirty, the process continues to writeback at step 20A. However if the data is invalid, or dirty, then the dirty bits are forwarded with the instruction to the appropriate execution unit e.g. fixed point unit, floating point unit, or the like, for inclusion in the instruction (step 4). For example, with an ADD instruction the target register ($R_1$) would be the register which will receive the result of the addition of the values from the source registers and the dirty bit will be forwarded to this instruction from a prior instruction that used the same target register. Also subsequent to dispatching at step 1, the modified bit vector is checked against the registers that are being called for as the data or operand sources for the instruction (step 2A). A determination as to whether the modified bits are set (indicating that the operands have been modified) is then made at step 3A. If the operand data has not been modified (corresponding bit in modified vector is cleared "0"), then the method proceeds to step 20A. However, if the data has been modified by a previous instruction (corresponding bit in modified vector is set "1"), then a signal is sent to the execution unit indicating that the instruction, that requires the data modified by a previous instruction, must retrieve the operand from the modified GPR rather than the architected GPR. Subsequent to steps 4 and 4A, the method proceeds to step 20A where it is determined if instruction processing has reached the writeback stage. The process loops back to step 20A and remains there until the writeback stage is reached. This portion of the process will continue at step 22 as described below.

Also, subsequent to step 1, it is determined at step 5 (FIG. 13) whether the data is forwarded from a prior instruction or read from the general purpose register. With reference to FIG. 10, this occurs at cycle 5 where the data is available. If the data is provided from a forwarding path, then the DL bits are set at step 6, i.e. the DL bits are initialized to e.g. 100 (when 3 cycles are required to determine the validity of load data). At step 7 it is determined if the source registers are dirty (a dirty bit was forwarded). If so, then the dirty bits for these instructions are set at step 8, i.e. the dirty bits are forwarded to younger instructions. If the source registers are not dirty, then the method proceeds to step 11. Subsequent to 8 the process continues to step 9.

The method of FIG. 13 continues to step 9 if the source data is provided from the GPR, rather than being forwarded (step 5). That is, if the date is not forwarded from a prior instructions, then it was obtained from the GPR. Step 9 determines if the instruction dispatch unit has indicated dirty data. If so, then step 10 sets the dirty bit. Subsequent to setting the dirty bit at step 10 or if the data from the IDU is not determined to be dirty at step 9, then step 9A determines if the bit from the modified bit vector in the instruction dispatch unit indicates modified data. If so, then a signal or other mechanism is used to indicate that the data from the modified GPR should be used. If the bit in the modified vector indicates the data was not modified, or subsequent to step 10A the method proceeds to step 11 where it is determined if the load reject signal has been received (indicating that the data loaded from cache is invalid). If so, then step 12 determines if the LSB of the DL bits is set and if so, the dirty bit is set (step 13). When the LSB of the DL bits is set then the dependency between the instructions in the pipeline is known. The dirty bit can be sent when the data reject signal for a corresponding load instruction is also known. However, the process continues to step 14 when either the load reject signal has not been received (step 11), or the lowest DL bit is not set (step 12) or subsequent to setting the dirty bit in step 13.

At step 14, the process checks to see whether the instruction is a load instruction, and if so the present invention then determines, at step 15, if the dirty bit is set. When it is determined by step 15 that the dirty bit is set, then step 16 blocks access to the cache. Subsequent to step 16 or if it is determined by step 14 that the instruction is not a load instruction or the dirty bit is not set (step 15), the process of the present invention continues to step 17 where it is determined whether the point in time where a load reject could occur has passed (e.g. cycle 7 of FIG. 9). If the rejection point has not been passed, as determined at step 17, then the DL bits are shifted at step 19 and the process loops back to step 11 where it is determined if a load reject has been received. If the process is past the point where validity is determined, then the DL bits are dropped, i.e. ignored, at step 18, because there is no need to track the progress of the instruction relative to the validity of its target or source registers. From step 18, the process continues to step 20B where it is determined if instruction processing has reached the writeback stage. The process loops back to step 20B and remains there until the writeback stage is reached. Once the writeback stage is reached, the dirty bits are transmitted to the IDU to be used by step 22. This completes the dirty bit processing steps performed by the execution unit.

Once the writeback stage is reached from steps 20A, the process continues to step 22, where the dirty bit sent from the unit in step 21 is checked to see if it is set. If so, then the bit in the "dirty" bit vector associated with the target register is set to "1" at step 23, indicating the result is not valid If the dirty bit from the unit is not set, then the bit in the "dirty" bit vector associated with the target register is set to "0" at step 24, indicating the result is valid. From both steps 23 and 24, the process continues to step 25 where the modified bit vector is updated by setting the bit corresponding to the target register (RT) for the instruction, if any. At this point, the process of writing the dirty and modified bit vectors is finished.

Although certain preferred embodiments have been shown and described, it should be understood that many changes and modifications may be made therein without departing from the scope of the appended claims.

The invention claimed is:

1. A microprocessor that speculatively executes instructions and commits results of non speculative instructions to at least one architected facility, said method comprising the steps of:

logic that determines the occurrence of a stall condition during the execution of said instructions;

at least one functional unit that speculatively executes speculative instructions during said stall condition across multiple pipeline stages;

circuitry that determines the validity of speculative data utilized during said speculative execution; and a non-architected facility that maintains said speculative data when said speculative instructions pass a last of said multiple pipeline stages, the non-architected facility having a non-architected facility register for each register of the at least one architected facility; and a modified bit vector, having a plurality of modified bits, associated with the non-architected facility, wherein:

the modified bit vector provides a modified bit for each non-architected facility register, and wherein the modified bit for a non-architected facility register is set in response to a result of a speculative instruction being written to a corresponding non-architected facility register in response to the speculative instruction passing the last of the multiple pipeline stages, said at least one functional unit retrieves valid data for use by said non speculative instructions upon removal of said stall condition, the modified bits of the modified bit vector correspond to entries in said architected facility for tracking a modified state of said data for the speculatively executed speculative instructions during their execution in said multiple pipeline stages of said microprocessor, said modified bit vector is provided to said speculatively executing speculative instructions which have a dependency on said speculative data that is determined to be modified, speculative instructions that have a dependency on a prior speculatively executed speculative instruction are speculatively executed using said modified data from said non-architected facility when a corresponding modified bit is a first value, and speculative instructions that have a dependency on a prior speculatively executed speculative instruction are speculatively executed using speculative data from said architected facility when said modified bit is a second value.

2. A microprocessor according to claim 1 further comprising a table for logically mapping said non-architected facility by an active thread of execution to a physical register file of a dormant thread in a simultaneous multithreaded (SMT) processor.

3. A microprocessor according to claim 1 wherein said architected facility is a register file, comprising:

said at least one functional unit logically mapping a non-architected facility to a physical extension of the register file wherein said physical register file has a capacity to store twice the number of architected entries corresponding to said microprocessor; and at least one read/write port on said physical register file that provides access to one-half of said entries used as an architected facility when a bit is set to a first value, and access to the other half of said entries used as a non-architected facility when said bit is set to a second value.

4. A data processing system for speculatively executing instructions in a microprocessor which commits results of non speculative instructions to at least one architected facility, comprising:

means for determining the occurrence of a stall condition during the execution of said instructions;

means for speculatively executing speculative instructions during said stall condition across multiple pipeline stages;

means for determining the validity of speculative data utilized during said speculative execution;

means for maintaining said speculative data in a non-architected facility when said speculative instructions pass a last of said multiple pipeline stages, the non-architected facility having a non-architected facility register for each register of the at least one architected facility;

means for maintaining a modified bit vector, having a plurality of modified bits, associated with the non-architected facility, wherein the modified bit vector provides a modified bit for each non-architected facility register, and wherein the modified bit for a non-architected facility register is set in response to a result of a speculative instruction being written to a corresponding non-architected facility register in response to the speculative instruction passing the last of the multiple pipeline stages;

means for tracking a modified state of said speculative data for the speculatively executed speculative instructions during their execution in said multiple pipeline stages of said microprocessor using the modified bit vector, wherein modified bits associated with said speculative data are provided to said speculative instructions which have a dependency on said speculative data that is determined to be modified;

means for speculatively executing speculative instructions having a dependency on a prior speculatively executed speculative instruction utilizing said modified data from said non-architected facility when a corresponding modified bit is set;

means for speculatively executing speculative instructions having a dependency on a prior speculatively executed speculative instruction utilizing said speculative data from said architected facility when a corresponding modified bit is cleared; and means for retrieving valid data for use by said non speculative instructions upon removal of said stall condition.

5. A data processing system according to claim 4 further comprising means for logically mapping said non-architected facility by an active thread of execution to a physical register file of a dormant thread in a simultaneous multithreaded (SMT) processor.

6. A data processing system according to claim 4 wherein said architected facility is a register file, said data processing system further comprising:

means for logically mapping a non-architected facility to a physical extension of the register file wherein said physical register file has a capacity to store twice the number of architected entries corresponding to said microprocessor; and means for accessing, by said microprocessor, one-half of said entries for use as an architected facility, and the other one-half of said entries for use as a non-architected facility.

7. The microprocessor of claim 1, wherein results of older speculative instructions are forwarded to younger speculative instructions via the non-architected facility, the younger speculative instructions reading the results from the non-architected facility registers, rather than the registers of the at least one architected facility, in response to modified bits, in the modified bit vector, corresponding to the registers of the at least one architected facility, being set.

8. The microprocessor of claim 1, wherein speculative instructions check a modified bit in the modified bit vector corresponding to a register of the at least one architected facility and read data from a corresponding non-architected facility register of the non-architected facility in response to a determination that the modified bit, corresponding to the register of the at least one architected facility, is set.

9. The microprocessor of claim 1, further comprising:

a dirty bit vector, separate from the modified bit vector, the dirty bit vector having a dirty bit for each non-architected facility register, wherein the dirty bits of the dirty bit vector identify registers having invalid data that cannot be forwarded to dependent instructions.

10. The microprocessor of claim 9, wherein:

for each instruction, at dispatch time, the instruction performs a lookup of a dirty bit in the dirty bit vector and a modified bit in the modified bit vector, associated with each source register of the instruction, the dirty bit in the dirty bit vector is used by the instruction to determine if data in a source register is valid, and the modified bit in the modified bit vector is used by the instruction to determine if data is to be read from the architected facility or the non-architected facility.

11. The data processing system of claim 4, wherein results of older speculative instructions are forwarded to younger speculative instructions via the non-architected facility, the younger speculative instructions reading the results from the non-architected facility registers, rather than the registers of the at least one architected facility, in response to modified bits, in the modified bit vector, corresponding to the registers of the at least one architected facility, being set.

12. The data processing system of claim 4, wherein speculative instructions check a modified bit in the modified bit vector corresponding to a register of the at least one architected facility and read data from a corresponding non-architected facility register of the non-architected facility in response to a determination that the modified bit, corresponding to the register of the at least one architected facility, is set.

13. The data processing system of claim 4, further comprising:

a dirty bit vector, separate from the modified bit vector, the dirty bit vector having a dirty bit for each non-architected facility register, wherein the dirty bits of the dirty bit vector identify registers having invalid data that cannot be forwarded to dependent instructions.

14. The microprocessor of claim 13, wherein:

for each instruction, at dispatch time, the instruction performs a lookup of a dirty bit in the dirty bit vector and a modified bit in the modified bit vector, associated with each source register of the instruction, the dirty bit in the dirty bit vector is used by the instruction to determine if data in a source register is valid, and the modified bit in the modified bit vector is used by the instruction to determine if data is to be read from the architected facility or the non-architected facility.

* * * * *